US011511562B2

(12) United States Patent
Frings et al.

(10) Patent No.: US 11,511,562 B2
(45) Date of Patent: Nov. 29, 2022

(54) METHODS FOR MANUFACTURING DECORATIVE LAMINATE PANELS

(71) Applicant: Agfa NV, Mortsel (BE)

(72) Inventors: Peter Frings, Mortsel (BE); Rudi Lamproye, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 16/965,378

(22) PCT Filed: Jan. 15, 2019

(86) PCT No.: PCT/EP2019/050968
§ 371 (c)(1),
(2) Date: Jul. 28, 2020

(87) PCT Pub. No.: WO2019/149519
PCT Pub. Date: Aug. 8, 2019

(65) Prior Publication Data
US 2021/0155032 A1    May 27, 2021

(30) Foreign Application Priority Data
Jan. 31, 2018    (EP) ..................................... 18154421

(51) Int. Cl.
*B44C 5/04*      (2006.01)
*B32B 3/06*      (2006.01)
(Continued)

(52) U.S. Cl.
CPC .................. *B44C 5/04* (2013.01); *B32B 3/06* (2013.01); *B32B 27/10* (2013.01); *B32B 27/304* (2013.01);
(Continued)

(58) Field of Classification Search
CPC .... B44C 5/04; B44C 1/28; B44C 3/12; B32B 3/06; B32B 27/10; B32B 27/304;
(Continued)

(56) References Cited

U.S. PATENT DOCUMENTS

2002/0189183 A1* 12/2002 Ricciardelli .......... B32B 27/304
52/390
2004/0045240 A1  3/2004 McIlvaine
(Continued)

FOREIGN PATENT DOCUMENTS

EP        1541373 A2    6/2005
EP        2865527 A1    4/2015
(Continued)

*Primary Examiner* — Nathan L Van Sell
(74) *Attorney, Agent, or Firm* — Leydig, Voit & Mayer, Ltd.

(57) ABSTRACT

A method for manufacturing a personalized or customized decorative surface (103) having decorative laminate panels (119) including the steps of: segmenting a digital image of the personalized or customized decorative surface (103) into a plurality of decorative laminate panel images (108), wherein each decorative laminate panel image (108) is sized to fit on a decorative laminate panel (119); assigning a positioning code (109) to a decorative laminate panel image (108) for identifying its position in the digital image of the personalized or customized decorative surface (103); creating a non-staggered digital layout (110) of the plurality of decorative laminate panel images (108); inkjet printing the non-staggered digital layout (110) on a substrate (112); heat pressing the inkjet printed substrate with a protective layer (115) into a decorative laminate (113); dividing the decorative laminate (113) into decorative laminate panels (119), wherein the front side of a decorative laminate panel (119) includes one of the plurality of inkjet printed decorative laminate panel images (108) and the back-side of decorative laminate panel (119) includes the positioning code (109) of
(Continued)

the decorative laminate panel image (108) inkjet printed on the front side of the decorative laminate panel (119).

12 Claims, 7 Drawing Sheets

(51) Int. Cl.
*B32B 27/10* (2006.01)
*B32B 27/30* (2006.01)
*B32B 27/32* (2006.01)
*B32B 27/36* (2006.01)
*B32B 27/40* (2006.01)
*B32B 37/10* (2006.01)
*B32B 38/00* (2006.01)
*B41M 5/00* (2006.01)
*B41M 7/00* (2006.01)
*B44C 1/28* (2006.01)
*B44C 3/12* (2006.01)

(52) U.S. Cl.
CPC .............. *B32B 27/32* (2013.01); *B32B 27/36* (2013.01); *B32B 27/40* (2013.01); *B32B 37/10* (2013.01); *B32B 38/0004* (2013.01); *B32B 38/145* (2013.01); *B41M 5/0047* (2013.01); *B41M 5/0064* (2013.01); *B41M 7/0027* (2013.01); *B44C 1/28* (2013.01); *B44C 3/12* (2013.01); *B32B 2307/412* (2013.01); *B32B 2307/75* (2013.01); *B32B 2451/00* (2013.01)

(58) Field of Classification Search
CPC ......... B32B 27/32; B32B 27/36; B32B 27/40; B32B 37/10; B32B 38/0004; B32B 38/145; B32B 2307/412; B32B 2307/75; B32B 2451/00; B41M 5/0047; B41M 5/0064; B41M 7/0027; B41M 5/0035
See application file for complete search history.

(56) References Cited

U.S. PATENT DOCUMENTS

2015/0210055 A1  7/2015  Pervan
2016/0348379 A1* 12/2016  Liu .......................... B27N 1/00

FOREIGN PATENT DOCUMENTS

EP        3095614 A1    11/2016
WO     WO-0147724 A1 *  7/2001  ........... E04B 9/0435

* cited by examiner

State-of-the-Art

METHODS FOR MANUFACTURING DECORATIVE LAMINATE PANELS

REFERENCE TO RELATED APPLICATIONS

This application is a 371 National Stage Application of PCT/EP2019/050968, filed Jan. 15, 2019, which claims the benefit of European Application No. 18154421.4, filed Jan. 31, 2018, which are incorporated by reference herein in their entirety.

TECHNICAL FIELD

The present invention relates to the manufacturing of decorative panels using inkjet technology.

BACKGROUND

Inkjet technology is replacing gravure printing for manufacturing decorative laminate panels, such as flooring laminate panels. Gravure printing requires a laborious set-up before actual printing can start. Hence, large production batches are made that result in a considerable stock of decorative laminate panels. By using inkjet technology, a laminate manufacturer can minimize his stock, since the inkjet printing can be done in-house and just-in-time (JIT). An example of such an improvement is shown in FIG. 2 in comparison to FIG. 1 of EP 2865527 A (AGFA).

Inkjet is also used to reduce repetition of decorative laminate panels. In gravure, the repetition is defined by the diameter of the gravure roll. Using gravure printing, on the average every floor panel occurs four times in a room of 25 square meter. Inkjet allows variable data printing, which makes it possible to obtain a floor without any repeating decorative laminate panel.

Variable data printing allows also to provide customized or even personalized images on the decorative laminate panels. There has been some limited manufacturing, where company names and logos were printed on individual decorative laminate panels.

There is however a desire to print a specific image, e.g. a photographic image of a tropical beach or a cartoon character, wherein that image covers the surface of multiple decorative laminate panels. An early patent disclosure for making a laminate floor with a custom image is US 2004045240 (MCILVAINE). However so far, it has proven to be impossible to manufacture in an economical manner flooring panels having a personalized image covering multiple flooring panels. Flooring panels are mounted in a staggered arrangement (see FIG. 1 D) for obtaining a sturdy floor. This means that the cutting of decorative laminate panels (see FIG. 1 B) has to be adapted, which results in cutting errors and a distorted printed image once mounted as a floor.

In addition, the true capabilities of inkjet printing are not yet exploited as it is not possible for a customer to order, in a cost-efficient manner, a personalized flooring laminate due to the complexity of the manufacturing process for decorative panels. The fact is that small personalized orders can easily get lost in the mass product manufacturing and that it is not easy to have a fast, error free delivery of the order to the customer.

Once delivered, the assembly of the decorative laminate panels to reproduce the personalized or customized image can be a real puzzle. The latter becomes especially true for decorative surfaces having more than 20 or even more than 50 decorative laminate panels.

Hence, there remains a need for manufacturing decorative laminate panels in a cost-efficient manufacturing wherein a personalized image covers the surface of multiple decorative laminate panels that are timely delivered to the right customer and that can be efficiently assembled to reproduce the personalized image.

SUMMARY OF INVENTION

In order to overcome the problems described above, preferred embodiments of the present invention have been realised with a method for manufacturing a personalized or customized decorative surface having decorative laminate panels as claimed in claim 1.

The use of a positioning code on the back-side of decorative laminate panels allows to efficiently assembly the decorative laminate panels so that the personalized or customized image is reproduced on a floor.

Economical benefits during manufacturing are obtained by inkjet printing a non-staggered digital layout allowing the decorative laminate panels to be cut according to straight lines, such as the vertical lines (2) and the horizontal lines (3) in FIG. 1 B rather a kind of zig-zag cutting.

For efficient delivery to a customer ordering a decorative surface, preferably on the back-side of decorative laminate panels also customer details or an identification code for identifying a customer or his delivery address are inkjet printed together with the positioning code.

Further advantages and embodiments of the present invention will become apparent from the following description.

BRIEF DESCRIPTION OF DRAWINGS

FIG. 1 A shows a decorative board (1) obtained after heat pressing. In FIG. 1 B, the decorative board (1) is then divided into individual decorative laminate panels (4) following vertical cutting lines (2) and horizontal cutting lines (3). The resulting decorative laminate panels (4) shown in FIG. 1 C are packaged and sent to a customer, who assembles the decorative laminate panels (4) randomly in a staggered arrangement on a ground surface of a room (5).

FIG. 6 B shows a decorative panel image (60) where account is taken of a bottom edge and a right edge to be cut off for providing a tongue to a decorative laminate panel by the inclusion of an extension zone (61) in the decorative panel image (60). This results in an undistorted image (63) as the extension zone was cut off for providing a tongue to the decorative laminate panel.

DESCRIPTION OF EMBODIMENTS

Manufacturing Methods

Figure 1:
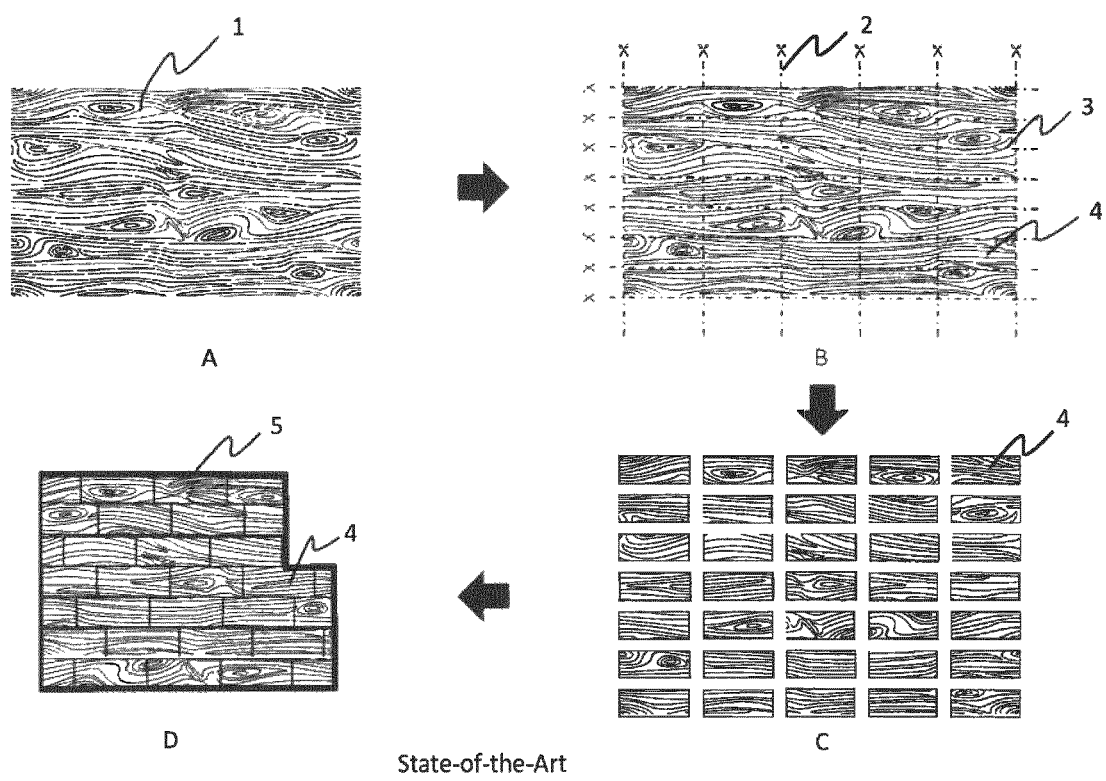
FIG. 1 is a schematic representation showing the state-of-the-art manufacturing of decorative flooring panels using inkjet or gravure.

A method for manufacturing a personalized or customized decorative surface (103) having decorative laminate panels (119) according to a preferred embodiment of the present invention including the steps of: segmenting a digital image of the personalized or customized decorative surface (103) into a plurality of decorative laminate panel images (108), wherein each decorative laminate panel image (108) is sized to fit on a decorative laminate panel (119); assigning a positioning code (109) to a decorative laminate panel image (108) for identifying its position in the digital image of the personalized or customized decorative surface (103); creating a non-staggered digital layout (110) of the plurality of decorative laminate panel images (108); inkjet printing the non-staggered digital layout (110) on a substrate (112); heat pressing the inkjet printed substrate with a protective layer (115) into a decorative laminate (113); dividing the decorative laminate (113) into decorative laminate panels (119), wherein the front side of a decorative laminate panel (119) includes one of the plurality of inkjet printed decorative laminate panel images (108) and the back-side of decorative laminate panel (119) includes the positioning code (109) of the decorative laminate panel image (108) inkjet printed on the front side of the decorative laminate panel (119).

Figure 2:
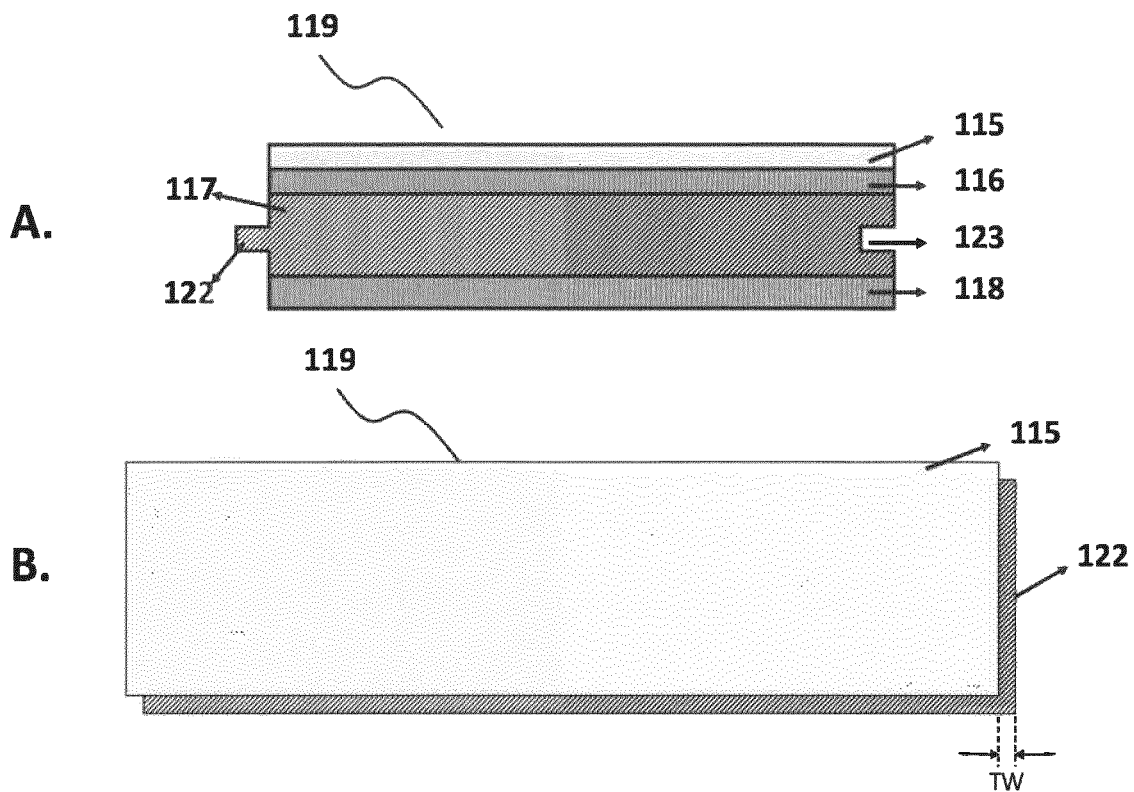
FIG. 2A shows a cross-section of a decorative laminate panel (119) including a core layer (117) with a groove (123) and tongue (122) which is laminated on the top side by a decorative layer (116) and a protective layer (115) and on the back side by a balancing layer (118).
FIG. 2B shows a top view of a decorative laminate panel (119) where the tongue (43) is sticking out by a width TW from below the protective layer (115). The sides of the decorative laminate panel (119) opposite to the tongue (122) contain a groove (not visible) having a depth of at least TW, preferably 10% more.
Figure 3A:
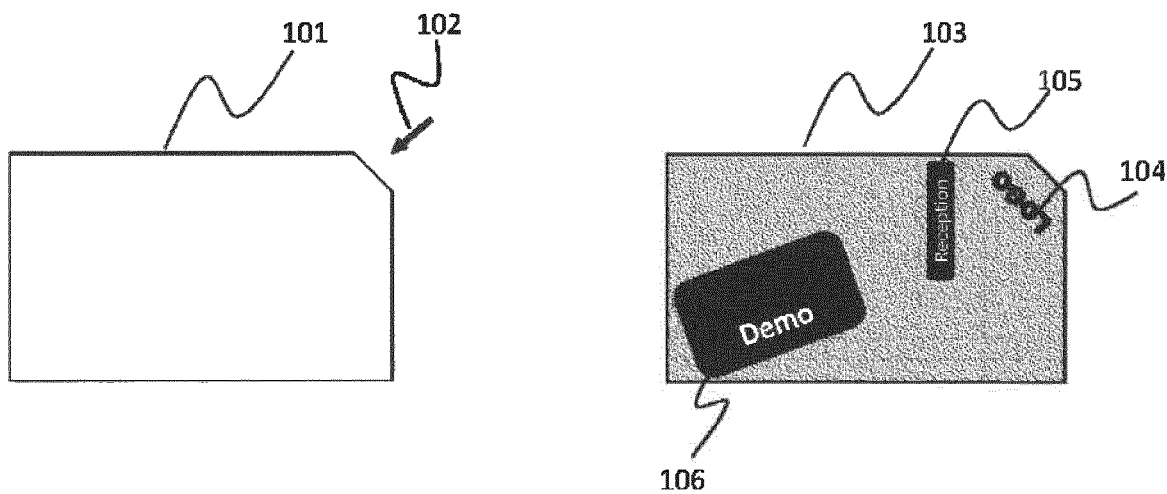
FIG. 3A to 3G shows an embodiment according to the invention for a method for manufacturing a personalized or customized decorative surface having decorative laminate panels.
Figure 3B:
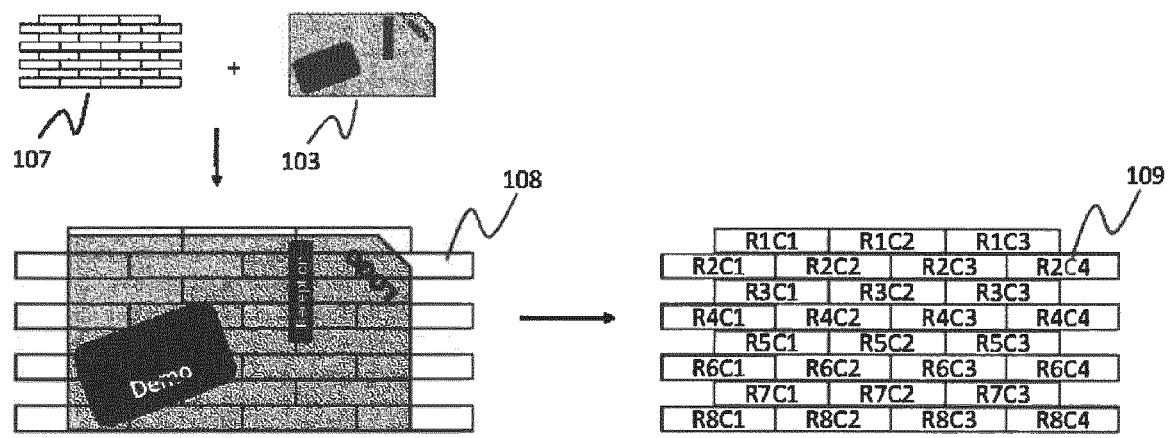
Figure 3C:
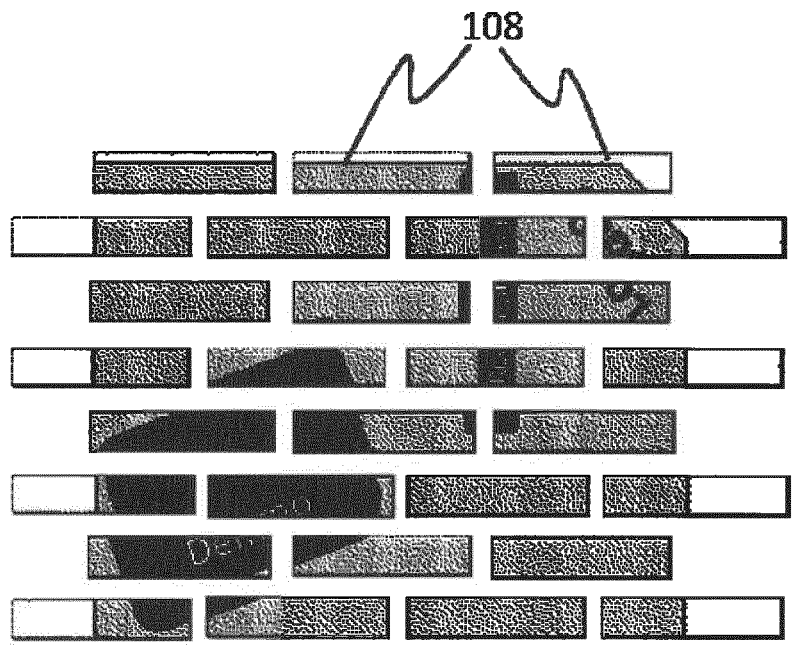
Figure 3D:
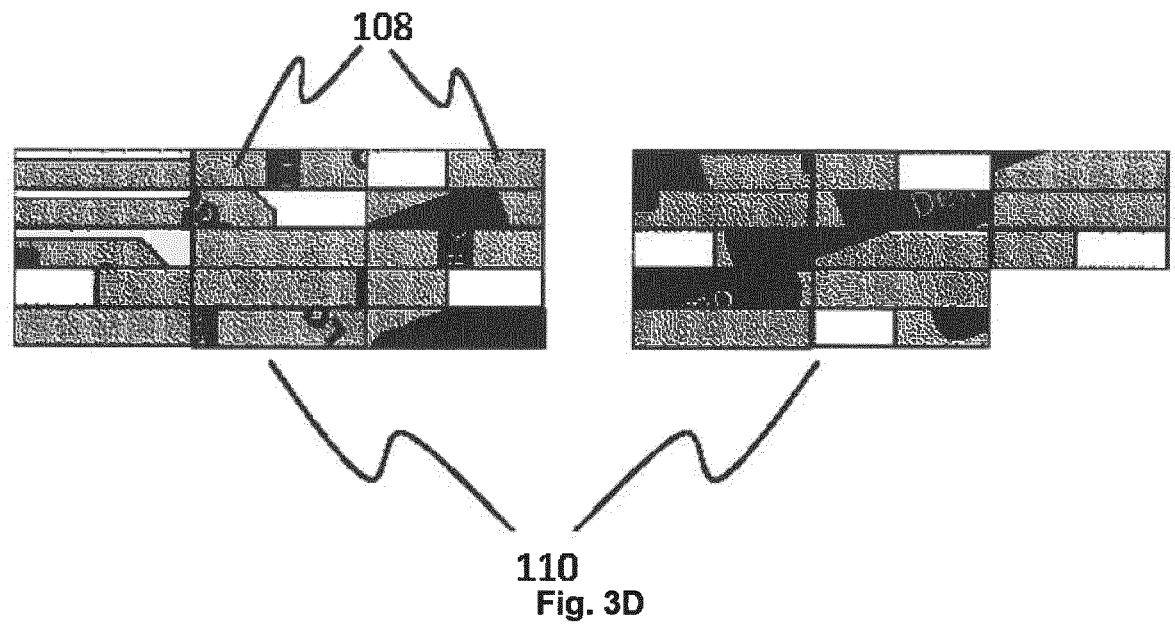
Figure 3E:
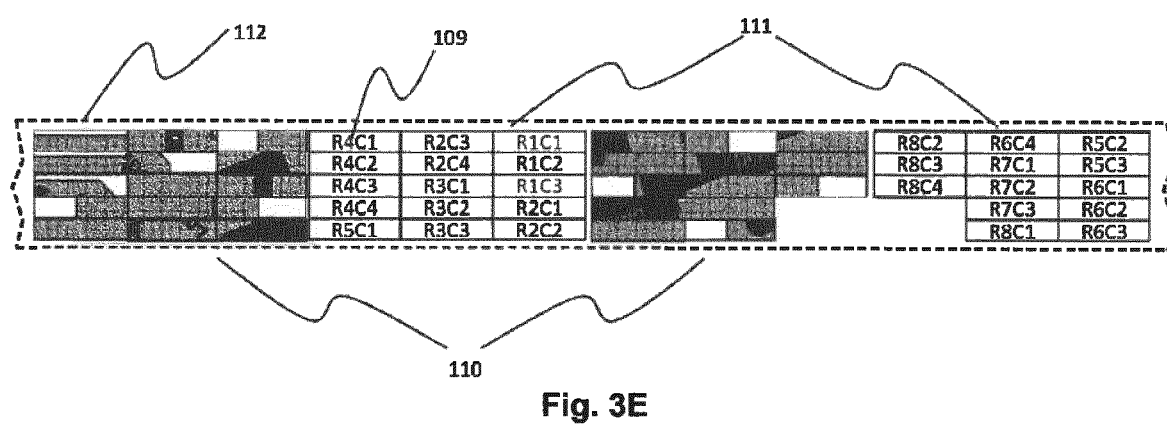
Figure 3F:
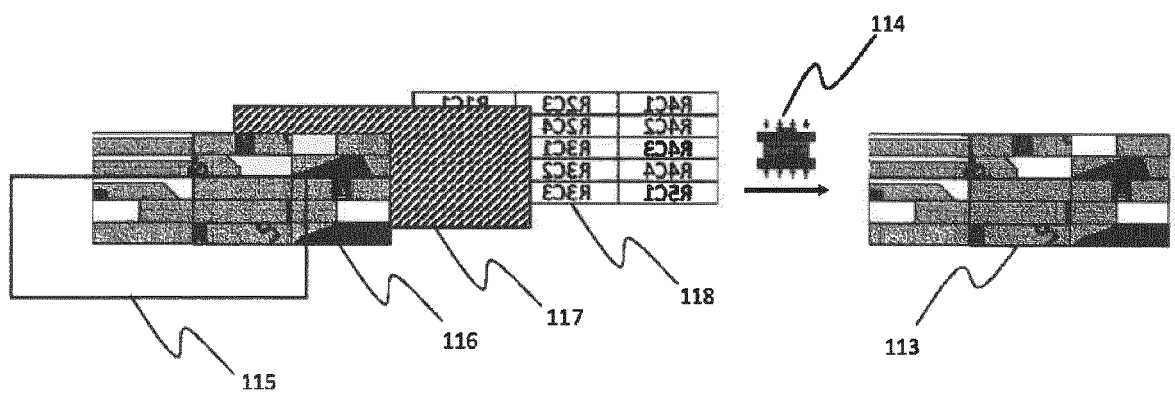
Figure 3G:
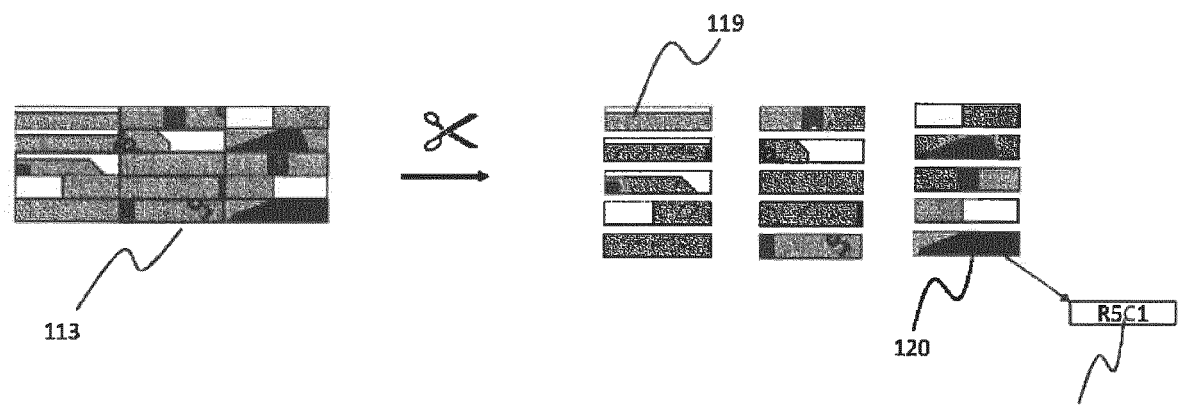

A preferred embodiment of the method according to the invention is illustrated in FIG. 3A to 3G for manufacturing a personalized or customized decorative surface having decorative laminate panels of the type shown in FIG. 2A. FIG. 3A shows a ground floor (101) of e.g. a shop having an entrance (102), which has to become a personalized decorative surface. The shape and the dimensions of the ground floor (101) are taken and reproduced on a computer screen as a digital image of the personalized decorative surface (103) including a company logo of the shop as a floormarking "Logo" (104) which can be observed by a customer entering the shop, a floormarking "reception" (105) where an entering customer is welcomed and an area having a floormarking "Demo" (106) where a product is demonstrated to the customer. In FIG. 3B, a staggered array (107) is applied to the digital image of the personalized decorative surface (103) segmenting it into a plurality of decorative laminate panel images (108) sized to fit on the decorative laminate panels. Each decorative laminate panel image (108) is assigned a positioning code (109) for identifying its position in the digital image of the personalized or customized decorative surface. For example, the indicated decorative laminate panel image (108) in FIG. 3B is assigned with "R2C4" as the positioning code. FIG. 3C illustrates how the digital image of the personalized decorative surface (103) in FIG. 3A has been segmented into individual decorative panel images (108). In FIG. 3D, the decorative panel images (108) of FIG. 3C are collected and non-staggered digital layouts (110) of the plurality of decorative panel images are made that will fit on a substrate when inkjet printed. In FIG. 3E, the non-staggered digital layouts (110) are inkjet printed together with the corresponding position code digital layouts (111) on a substrate (112), e.g. a paper web substrate. The inkjet printed non-staggered digital layout (110) and the corresponding position code digital layout (111) will form a decorative layer (116) respectively a balancing layer (118) in a decorative laminate panel (119) as shown in FIG. 2A. FIG. 3G, shows how a decorative laminate board (113) is heat pressed (114) from an assembly having, in order, a protective layer (115), a decorative layer (116), a core layer (117) and a balancing layer (118). In FIG. 3G, it can also be seen that the balancing layer (118) is present in the assembly so that the positioning codes are oriented away from the core layer (117), making them readable. In FIG. 3G, the decorative laminate board (113) is divided into decorative laminate panels (119). For a specific decorative laminate panel (120), the panel back-side (120) is shown having "R5C1" as the corresponding positioning code (109) of the specific decorative laminate panel (120).

As also shown in FIG. 3B, the segmenting is preferably performed according to a staggered array. This may not be really necessary for decorative wall panels, but for flooring panels it is advantageous for obtaining a sturdy floor.

There is no limitation on the way that the positioning code is applied on the back-side of a decorative laminate panel. However, it is preferably applied by inkjet printing or laser marking, more preferably it is applied simultaneously with the inkjet printing of the personalized or customized decorative surface as illustrated in FIG. 3E.

In addition to the positioning code on the back-side of a decorative laminate panel, preferably also customer details or an identification code for identifying a customer or his delivery address are applied to the back-side of one or more, but most preferably all the decorative laminate panels. An advantage of having customer details or an identification code on each decorative laminate panel is that the reordering of a single decorative laminate panel is facilitated when a panel became damaged during transport or during assembly of the floor. The customer details or the identification code provide also advantages for track-and-trace in the manufacturing chain.

The decorative laminate panels preferably have a tongue and groove for fast and easy assembly of e.g. a floor. The tongue and groove can be machined into the decorative laminate panels using so-called double end tetoners, as those available from HOMAG and KRAFT Maschinenbau. However, during this machining, part of the decorative panel image at the edges is removed, which results in an "interrupted" image. In order to avoid this, preferably a so-called extension zone is present having a width corresponding to that which is machined away for providing the tongue and groove. This extension zone may be left blank, but if the machining is performed inaccurately one or more white lines may be present in the decorative surface if the used substrate is white paper. In a preferred embodiment, the occurrence of white lines through inaccurate machining by double end tetoners is eliminated by repeating in the extension zone image data retrieved from neighbouring decorative laminate panel images in the digital image of the personalized or customized decorative surface.

For most decorative applications, the substrate used for inkjet printing is preferably a paper substrate as the brings economical benefits. The inkjet printing of the non-staggered digital layout on the paper substrate is preferably performed by one or more aqueous pigmented inkjet inks. The latter can be before or after thermosetting resin impregnation, but is preferably performed before thermosetting resin impregnation. The use of aqueous pigmented inkjet inks provides advantages for image permanence (light fading minimized by pigments) and for safety and environmental advantages as aqueous inks are used instead of organic solvent based inks.

For enhancing the image quality, the one or more aqueous pigmented inkjet inks are preferably inkjet printed on one or more ink-receiving layers present on the paper substrate.

In a more preferred embodiment of the inkjet printing method, the at least one ink-receiving layer contains a polyvinylalcohol polymer and an inorganic pigment.

In a particularly preferred embodiment of the inkjet printing method, an outermost ink-receiving layer contains no inorganic pigment or contains a smaller content of inorganic pigment than an ink-receiving layer between the paper substrate and the outermost ink-receiving layer.

In a preferred embodiment, the positioning code is inkjet printed on a paper substrate for forming a balancing layer in the decorative laminate panel. This inkjet printing is preferably performed together with the inkjet printing of the non-staggered digital layout as shown in FIG. 3E, i.e. one after the other. This way errors of combining the decorative layer and the balancing layer in the assembly shown in FIG. 3F are minimized.

For other decorative applications, where water resistance becomes important, e.g. a personalized decorative floor in a bathroom, the paper substrate is preferably replaced by a thermoplastic substrate based on a material selected from the group consisting of polyvinylchloride (PVC), polypropylene (PP), polyethylene (PE), polyethylene-terephthalate (PET) and thermoplastic polyurethane (TPU) and combinations thereof. Most preferably PVC is used as thermoplastic substrate. Conventional decorative laminate panels of the PVC are known in the industry as LVT, an abbreviation used for Luxury Vinyl Tiles. In a preferred embodiment, the decorative laminate panel image or the positioning code is inkjet printed using one or more free radical UV curable inkjet inks instead of solvent based inkjet inks as this brings not only economical and environmental advantages, but also for image quality as UV curing can freeze the jetted image.

The decorative laminate, usually a decorative board, is divided into decorative laminate panels by following vertical and horizontal cutting lines as shown in FIG. 3G. The latter is possible by inkjet printing a non-staggered digital layout (110) as shown in FIG. 3D.

For interior decoration, the personalized or customized decorative image may include wood grain as a background. It was found that the classic CMYK inkjet ink set was insufficiently capable of reproducing all the different shades in wood colour. One could resolve this by including an additional brown or red inkjet ink, however this makes the inkjet printing more costly and more complex (e.g. colour management). It was found that by replacing the magenta inkjet ink by a red inkjet ink, that a high colour gamut could be retained while simultaneously being capable to print all desired brown colours present in wood grain images. This was especially true if the red inkjet ink contained a red pigment selected from the group consisting of C.I. Pigment Red 254, CI. Pigment Red 176 and C.I. Pigment Red 122 or mixed crystals thereof.

It was found that a CRYK inkjet ink set was generally also capable of reproducing most customized and personalized images. In some cases, it was found that a higher image quality (colour vibrancy) could be obtained by extending the CRYK inkjet ink set with extra inks such as magenta, green, blue, and/or orange. Extending the inkjet ink set with these extra inks further enlarges the colour gamut of the image, albeit at an economical cost. The inkjet ink set may also be extended by the combination of full density inkjet inks with light density inkjet inks. The combination of such dark and light colour inks and/or black and grey inks improves the image quality by a lowered graininess.

A particularly preferred CRYK inkjet ink set contains a black inkjet ink containing a carbon black pigment, a yellow inkjet ink containing a yellow pigment selected from the group consisting of C.I. Pigment Yellow 150, C.I. Pigment Yellow 151 and mixed crystals thereof; a red inkjet ink contained a red pigment selected from the group consisting of C.I. Pigment Red 254, CI. Pigment Red 176, C.I. Pigment Red 122 and mixed crystals thereof; and a cyan inkjet ink containing a beta-copper phthalocyanine pigment.

The use of C.I. Pigment Yellow 150 in the yellow inkjet ink and a beta-copper phthalocyanine pigment, such as C.I. Pigment Blue 15:3 or C.I. Pigment Blue 15:4, provided laminate panels exhibiting excellent light stability.

In the most preferred embodiment, a CRYK inkjet ink set is used containing a black inkjet ink containing a carbon black pigment, a yellow inkjet ink containing a yellow pigment selected from the group consisting of C.I. Pigment Yellow 150 or mixed crystals thereof; a red inkjet ink contained a red pigment selected from the group consisting of C.I. Pigment Red 254, CI. Pigment Red 176 or mixed crystals thereof; and a cyan inkjet ink containing a beta-copper phthalocyanine pigment.

Positioning Codes

For fast and easy assembly of the personalized or customized decorative surface, some of the decorative laminate panels, i.e. at least the decorative laminate panels containing image details other than a background of e.g. a wood-grain, but preferably all decorative laminate panels, are provided with a positioning code. A positioning code on all decorative laminate panels ensures that, for example, a cartoon character printed on decorative panels for a children's bedroom will not be hidden by a bed or cupboard.

The positioning codes may be applied in any desired form. The numbers can be printed, laser marked or labelled on the back-side of a decorative laminate panel.

There is no limitation of the design of the positioning code. It may consist of plain numbers (1, 2, 3, 4, 5, ... ) or they can have a form RnCm with R representing a row, C representing a column and n and m representing integers. For example, a first decorative laminate panel may have the number R1C1, while the decorative laminate panel on the right side will have the number R1C2. The first decorative laminate panel in a second row above the first decorative laminate panel will have the number R2C1. An illustration of this positioning code is shown in FIG. 3B.

The positioning code helps the customer to assemble the decorative laminate panels into the correct staggered arrangement reproducing the personalized or customized decorative surface. Preferably, an assembly layout is included in the packaging of a set of decorative laminate panels. Alternatively, a code may be applied on the packaging, such as a barcode or a QR code, which can be scanned by e.g. a smart phone to visualize or print the assembly layout.

Customer Details and Identification Codes

Until now, the manufacturing of decorative laminates resulted in a mass product allowing only limited customization and no personalization. The current inkjet printing method allows that the decorative patterns are customized and even personalized by the customer. Personalization can, for example, be the inkjet printing of a kid's favorite cartoon character on floor laminates for his bedroom. Customization means that a limited series of decorative surfaces are made, for example, similar sets of floor laminate panels for a chain of shops.

For fast delivery of such personalized or customized decorative laminate panels, an identification code is preferably generated upon ordering by a customer of a set of decorative laminate panels for directly or indirectly linking the set of decorative laminate panels to the customer of his delivery address. The identification code is preferably printed on the back-side of decorative laminate panel.

Instead of an identification code also customer details, such as name and delivery address, may be applied on the back-side of decorative laminate panel as alphanumeric data. The advantage is that an employee of the décor printer and the laminate manufacturer can immediately read this without any electronic tools.

In an even more preferred embodiment, both an identification code and customer details are applied, preferably inkjet printed, on the back-side of decorative laminate panel.

The identification code is preferably used for identifying a set of decorative laminate panels and its customer. In the latter case, the identification code is directly or indirectly connected to the customer or his delivery address. The wording "directly connected" means that no intermediate codes or linkages are used, but that the identification code corresponds in a database directly to the customer. "Indirectly connected" means that a series of codes is used that taken together makes a connection between the printed identification code and the customer. For example, the series of codes may include a print code given by the décor printer and a manufacturing code given by the laminate manufacturer. By using this series of codes in perhaps several databases, the customer and his delivery address can be retrieved.

In a preferred embodiment, the identification code is directly connected to the customer or his delivery address. By a direct connection, less errors occur thereby avoiding delivery at the wrong customer or even loss of the actual customer information.

The identification code can be applied by any suitable manner, such as inkjet printing, laser marking or using an adhesive label applicator.

In a preferred embodiment, the identification code is applied by inkjet printing, preferably by the one or more inkjet inks for printing the decorative pattern. The advantage is that the inkjet printing is simplified as no extra measures or equipment is necessary. When laser marking is used, a synchronisation between the inkjet printing device printing the decorative pattern and the laser marking equipment applying the identification code is required. This is also necessary for the adhesive label application, where furthermore some labels may get detached during the process (e.g. during the impregnation process of a printed paper substrate web) thereby destroying the connection with the customer.

There is no real limitation on the form of the identification code. For example, the identification code may be a simple bar code, which can be simply scanned by a handheld barcode scanner during the manufacturing process. It may also be a so-called 2D code. Preferred 2D codes include a QR code, a datamatrix code, a cool-data-matrix code, an aztec code, an upcode, a trillcode, a quickmark code, a shot code, a mcode, a beetagg and the like.

Figure 7:
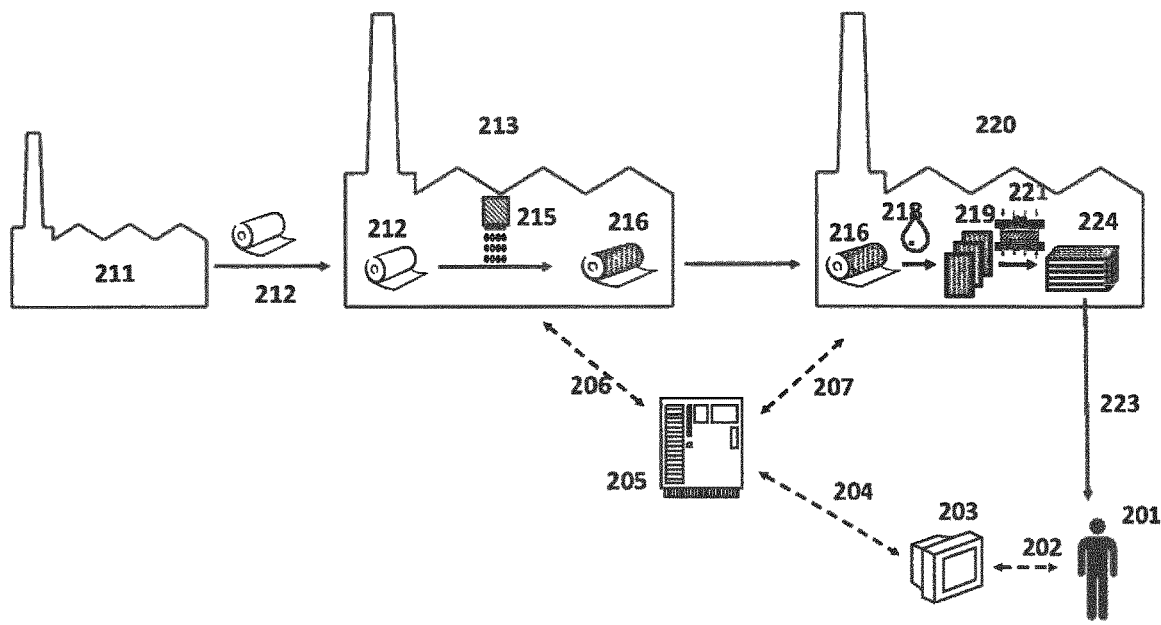
FIG. 7 shows an embodiment of a method for manufacturing decorative laminate panels involving a décor printer and a laminate manufacturer. On an input device (203) digitally connected (204) to a computer (205), a customer (201) defines a laminate order (202), which is assigned an identification code. A print job for the laminate order (202) is then provided by the computer (205) via a digital connection (206) to a decor printer (213), which prints on a paper roll (212) from a paper manufacturer (211) using an inkjet printer (215) resulting in a decor paper roll (216) with the one or more decorative patterns from the laminate order (202) and the assigned identification code. The decor paper roll (216) is then delivered to a laminate manufacturer (220), who impregnates (218) it with a thermosetting resin and cuts to a size (219) for being heat pressed (221) and finished into ready-to-use floor laminate (224). The identification code is used for delivery (223) of the ordered laminate (224) to the customer (201).
Figure 8:
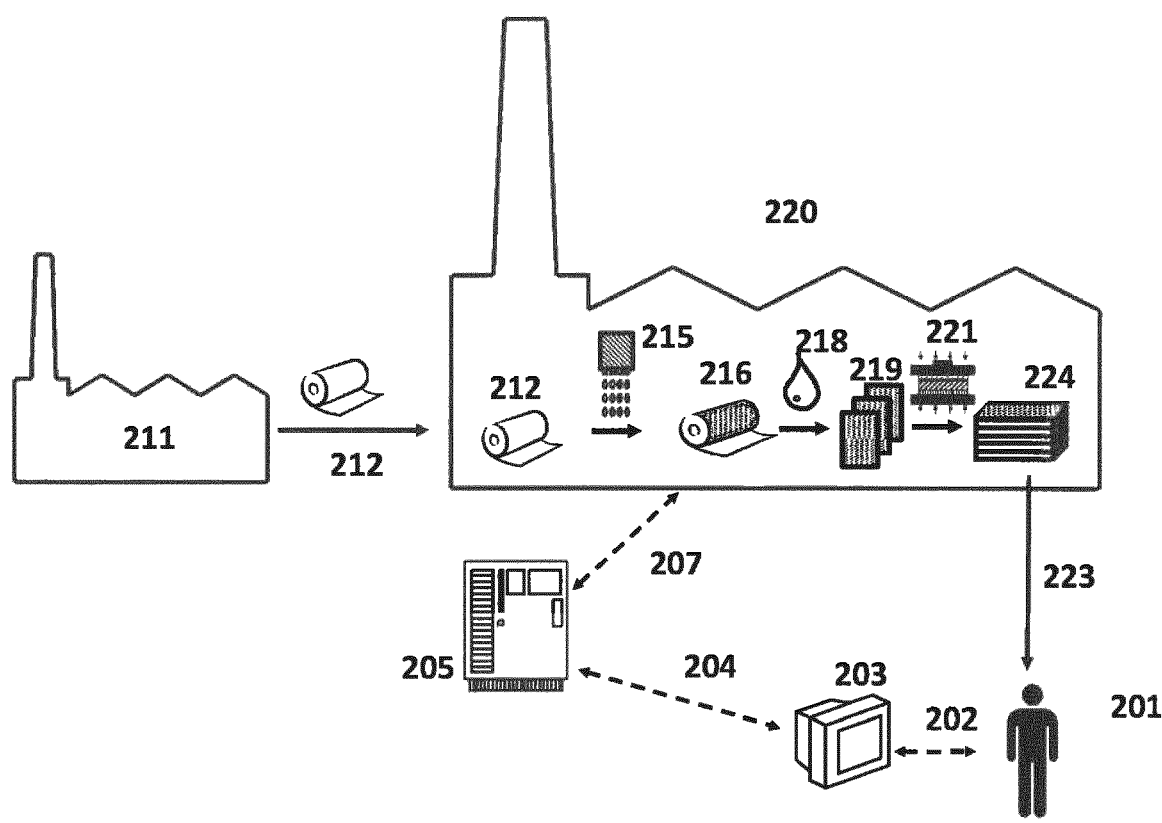
FIG. 8 shows another embodiment of a method for manufacturing decorative laminate panels involving no décor printer as the inkjet printing is performed at the laminate manufacturer. On an input device (203) digitally connected (204) to a computer (205), a customer (201) defines a laminate order (202), which is assigned an identification code. A print job for the laminate order (202) is then provided by the computer (205) via a digital connection (207) to a decor printer (220), which prints on a paper roll (212) from a paper manufacturer (211) using an inkjet printer (215) resulting in a decor paper roll (216) with the one or more decorative patterns from the laminate order (202) and the assigned identification code. The decor paper roll (216) is then impregnated (218) with a thermosetting resin and cut to a size (219) for being heat pressed (221) and finished into ready-to-use floor laminate (224). The identification code is then used for delivery (223) of the ordered laminate (224) to the customer (201).

The identification code may be changed during the ordering and the manufacturing process and thus need not be identical to the one created when, as shown by FIG. 7 and FIG. 8, a customer (201) defines a laminate order (202) via an input device (203) digitally connected (204) to a computer (205). For example, the identification code may be updated for track-and-trace purposes throughout the manufacturing chain, so that it can be determined at which stage of the manufacturing process or delivery process the laminate order has arrived. In changing the identification code, the connection with the customer should be maintained, for example, in a database of the computer (205). The database may contain a series of codes connected to the laminate order. For example, the type of codes used at a decor printer (213) may differ from those used at the laminate manufacturer (220) as different types of scanners or different software are used.

An identification code on a substrate web can be used for a wide range of purposes. A non-exclusive list of purposes is given here below.

Firstly, an identification code can be used for identifying a set of decorative laminate panels to be manufactured for a customer. This occurs in FIG. 7 and FIG. 8 when a customer (201) defines a laminate order (202) on an input device (203) digitally connected (204) to a computer (205). The definition of the laminate order includes not only the brand, the decoration pattern and the number of panels needed, but may involve items related to the finishing such as V-groove or not, quality level (AC3-AC4-AC5), thickness of the panel, uploaded personalized image files (e.g. company logo, cartoon character for a child's bedroom floor, . . . ), etc.

The identification code can be used for identifying a decorative substrate web manufacturer (décor printer) as different brands (laminate manufacturers) may work with different décor printers.

The identification code can be used for identifying a decorative image to be inkjet printed by the décor printer (FIG. 7) or the decorative laminate manufacturer (FIG. 8). The identification of the decorative image may include the uploading of personalized image files.

The identification code can be used for identifying a decorative laminate manufacturer, as he may use a different width of paper rolls for impregnation. It may also be simply for logistic reasons, such as delivering the printed décor substrate web to the decorative laminate manufacturer after it has been completed.

As laminate order may come from different locations and at different times, the identification code can be used for aggregating the print jobs of the laminate orders by the decorative substrate web manufacturer into an aggregate print job to be printed on one and the same substrate web for the decorative laminate manufacturer. The advantage is that decorative paper rolls do not have to be cut up for different laminate manufacturers, which results in waste.

The identification code can be used for enabling the decorative laminate manufacturer to track the progress of delivery of the inkjet printed substrate web by the decorative substrate web manufacturer. This way the laminate manufacturer can plan his production in an efficient and economical manner.

If the name of the customer and the delivery address was not inkjet printed on the substrate web, the identification code can be used for identifying the customer of the set of decorative laminate panels so that it can be shipped to the customer. At the same time, it can be checked if the laminate order is complete. One package of decorative panels usually contains enough panels to cover a surface of about one square meter. If the customer ordered 24.5 $m^2$ of decorative panels, then it can be checked if there are 25 packages.

If no delivery address is present, the identification code can be used not only to retrieve the delivery address, but also for automatically printing shipping labels for delivering the set of decorative laminate panels to the customer.

During transport, the identification code can be used for delivering the set of decorative laminate panels to the customer. A machine readable identification code can be scanned during the transport process for enabling the customer to track the progress of delivery of the set of decorative laminate panels. If the customer is a laminate shop, then the shop can use the identification code for informing the end-customer if the decorative panels have already been manufactured or are in transport.

The identification code can be used for authentication of the set of decorative laminate panels. This is especially useful if a customer would order decorative panels of a certain brand via the internet and wants to confirm via the brand website if the received decorative panels are not made by an alternative laminate manufacturer delivering decorative panels of inferior quality.

The identification code may also serve for marketing purposes, such as customer engagement. Customer engagement is a business communication connection between an external stakeholder (customer) and an organization (company or brand). The connection can take place online or offline. Preferably, the connection is made online, for example when the customer scans the identification code with his smartphone and is taken to a certain website of the laminate manufacturer or brand to enhance the overall customer experience.

The identification code may be used during manufacturing for retrieving information for manufacturing operations, i.e. for automation of manufacturing. For example, information on the size of sheets to be cut from the substrate web can be retrieved. Laminate boards may be cut to a length of e.g. 1.24 m or 2.48 m. By connecting this information to the information code, the cutting process of the substrate web can be automated.

Decorative Laminate Panels

The present invention also provides a decorative laminate panel as obtained by a manufacturing method disclosed here above.

A decorative laminate panel for a personalized or customized decorative surface according to a preferred embodiment of the present invention, wherein: the front side of the decorative laminate panel includes an inkjet printed decorative laminate panel image that represents a portion of the personalized or customized decorative surface; and the back side of decorative laminate panel includes a positioning code for positioning the decorative laminate panel in the correct location of the personalized or customized decorative surface.

In a more preferred embodiment, the back-side of the decorative laminate panel further includes customer details or an identification code for identifying a customer or his delivery address. This allows timely delivery of the finished decorative laminate panels, especially in the case where both a décor printer and a laminate manufacturer are involved.

Decorative laminate panels are usually shipped in a package including a set of decorative laminate panels covering about 1 $m^2$ of surface. This allows easy handling when assembling the decorative surface.

In one embodiment, a set of decorative laminate panels includes at least one decorative laminate panel according to the present invention described here above. It is not imperative that all decorative laminate panels have a positioning code on the back-side of the panel. For example, a set may contain a single decorative laminate panel including part of a personalized image, e.g. a cartoon figure for the floor of a child's bedroom, while the other panels are merely "background" panels, such as wood-grain panels shown in FIG. 1. For wood-grain panels, a correct positioning is not necessary as it does not provide a disturbing distorted decorative image, thus allowing random selection of such a background panel. However, in the most preferred embodiment, each decorative laminate panel includes a positioning code on the back-side of decorative laminate panel. The latter is especially useful for very large surfaces.

In a particularly preferred embodiment, the set of decorative laminate panels includes an assembly layout in the package. The assembly layout helps to position the decorative laminate panels in the correct position so that the original personalized or customized decorative surface image is reproduced on e.g. a floor if the decorative laminate panels are floor panels. The assembly layout may be a physical assembly layout or a virtual assembly layout.

An example of a physical assembly layout is an assembly layout printed on a piece of paper accompanying the decorative laminate panels in a package or more preferably an assembly layout printed on the back-side of a decorative laminate panel.

A virtual assembly layout is most preferably printed as a code on the back-side of a decorative laminate panel. For example, the virtual assembly layout can be a QR-code or a barcode, which can be scanned by a smart phone to download the assembly layout to the smartphone. Alternatively, the identification code can be used to download the assembly layout from a website.

An illustration of an assembly layout is given in FIG. 3B as the staggered array containing the "RnCm" position codes with n and m representing integers.

As already described above, the decorative laminate panels come in two forms. Generally, the decorative panels for multi-purpose applications include a paper substrate preferably having one or more ink-receiving layers whereon aqueous pigmented inkjet inks have been printed before impregnation by a thermosetting resin. Such panels will be referred to here below as "wood-based laminate panels". In the alternative case, the decorative laminate panels include a thermoplastic substrate printed upon by one or more UV curable inkjet inks. Such panels will be referred to here below as "thermoplastic laminate panels".

A base layer and a core layer have the same purpose of providing some strength to the decorative laminate panel, so that it does not break into pieces when bent. The base layer (55) in a thermoplastic decorative laminate panel corresponds to the core layer (41) in a wood based decorative laminate panel.

Another aspect of the invention is to provide a set of decorative laminate panels obtained by a manufacturing method as described above, wherein the decorative laminate panels assembled in staggered arrangement are capable of reproducing the requested personalized of customized decorative image without any distortion. The decorative laminate panels in the set of decorative laminate panels preferably have a tongue and groove connection, more preferably further including an alignment aid for achieving the selected staggering distance between two decorative laminate panels.

There is no limitation on the shape or number of the alignment aids. An example of an alignment aid (74+75) is shown in FIG. 7. The decorative laminate panel (70) and a neighbouring decorative laminate panel (71), both have a tongue (72) with a missing part of a tongue (74) and, not visible, a groove (73) with an unmilled groove (75). The missing part of a tongue (74) and the unmilled groove (75) can be slid into each other because they have similar dimensions and shape, preferably the same dimensions and shape.

Wood-Based Laminate Panels

A wood-based laminate panel contains at least a core layer, a decorative layer and a protective layer and preferably contains also a balancing layer. A cross-section of such a decorative panel is shown by FIG. 2.

A decorative panel, like a floor panel, has a decorative layer on one side of the core layer and a balancing layer on the other side of the core layer.

The decorative panels are preferably selected from the group consisting of flooring panels, ceiling panels and wall panels, more preferably the decorative panels are flooring panels.

In order to protect the decorative image of the decorative layer against wear, a protective layer is applied on top of the decorative layer. A balancing layer may be applied on the opposite side of the core layer to restrict or prevent possible bending of the decorative panel. The assembly into a decorative panel of the balancing layer, the core layer, the decorative layer, and a protective layer is preferably performed in the same press treatment of preferably a DPL process (Direct Pressure Laminate).

In a preferred embodiment of decorative panels, tongue and groove profiles (122 respectively 123 in FIG. 2) are milled into the side of individual decorative panels which allow them to slide into one another, preferably after applying glue to them. The tongue and grove join ensures, in the case of flooring panels, a sturdy floor construction and protects the floor, preventing dampness or water from penetrating.

Figure 4:
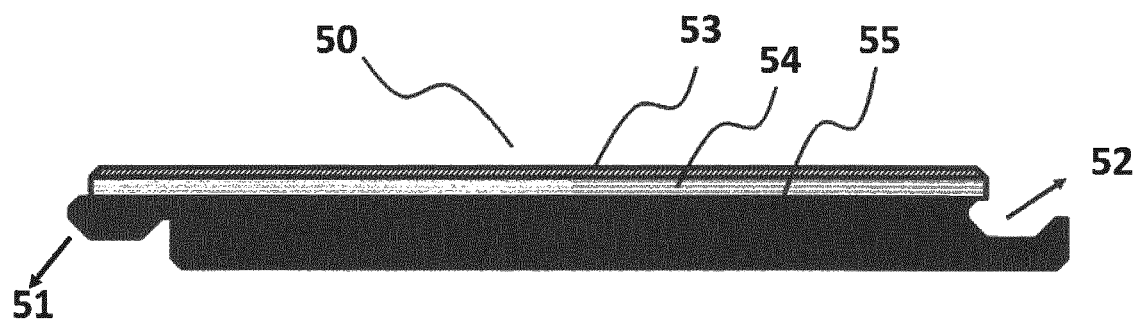
FIG. 4 shows a cross-section of a decorative laminate panel (50) including a base layer (55) with a tongue (51) and a groove (52), laminated on the top side by a transparent or opaque thermoplastic foil (54) and a transparent thermoplastic foil (53), wherein at least one of the thermoplastic foils (53, 54) carries an inkjet printed image.
Figure 5:
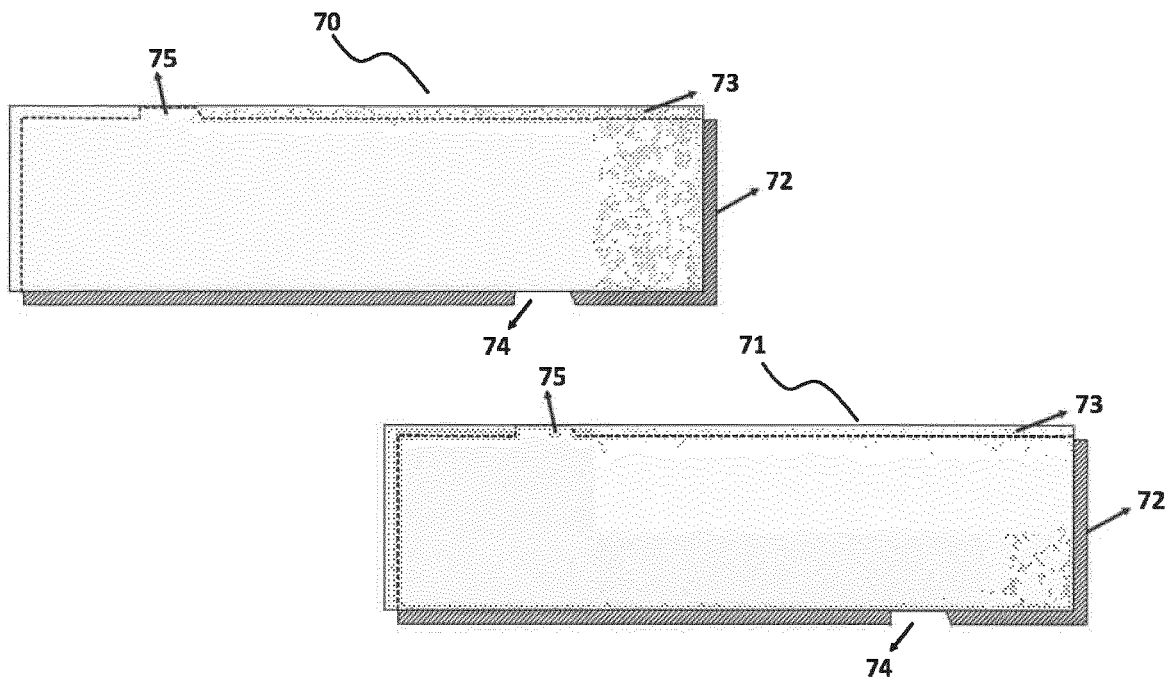
FIG. 5 shows a top view of a decorative laminate panel (70) and a neighbouring decorative laminate panel (71). Both panels having a tongue (72) and (not visible) a groove (73) that has been provided with an alignment aid comprising a missing part of a tongue (74) and (not visible) an unmilled groove (75), which have similar dimensions and shape so that they fit into each other when the tongue (72) of the decorative laminate panel (70) is slid into the groove (73) of the neighbouring decorative laminate panel (71).
Figure 6:
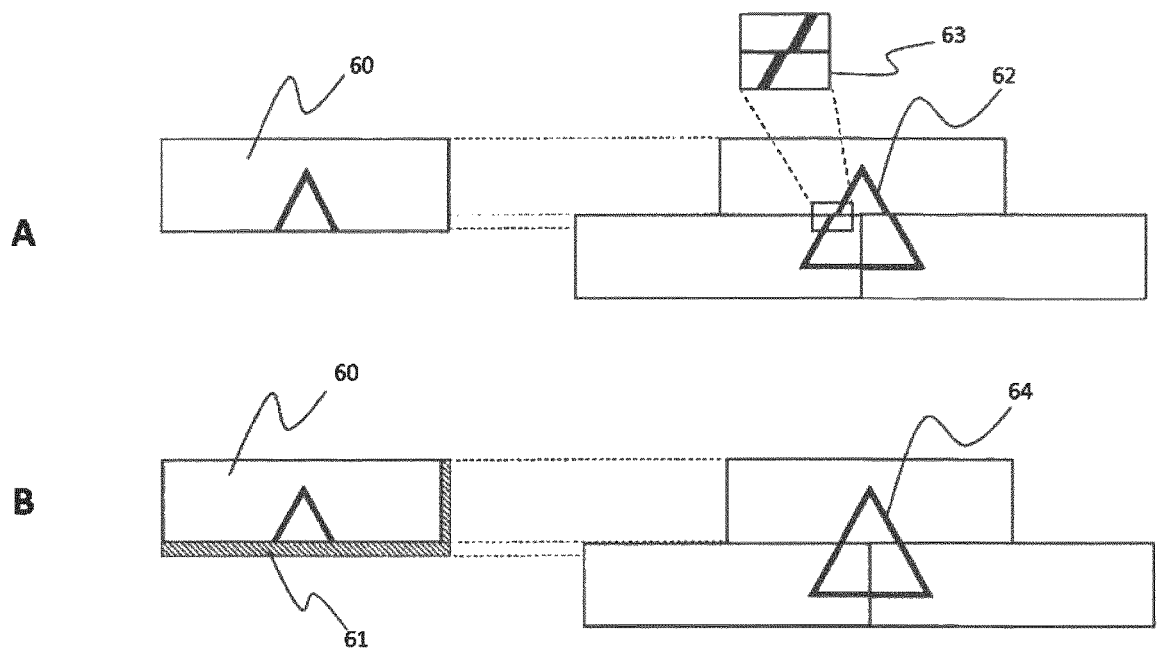
FIG. 6 A shows a decorative panel image (60) where no account is taken of a bottom edge and a right edge to be cut off for providing a tongue to the decorative laminate panel. This results in a distorted image (62) as shown in a close-up of part of the distorted image (63).

In a more preferred embodiment, the decorative panels include a tongue and a groove of a special shape (e.g. 51 respectively 52 in FIG. 4) which allow them to be clicked into one another. The advantage thereof is an easy assembly requiring no glue. The shape of the tongue and groove necessary for obtaining a good mechanical join is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

The decorative panels may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative laminates as exemplified by EP 1567334 A (FLOORING IND).

The top surface of the decorative laminate panel, i.e. at least the protective layer, is preferably provided with a relief matching the background image, such as for example the wood grain, cracks and knots in a woodprint. Embossing techniques to accomplish such relief are well-known and disclosed by, for example, EP 1290290 A (FLOORING IND), US 2006144004 (UNILIN), EP 1711353 A (FLOORING IND) and US 2010192793 (FLOORING IND).

Most preferably, the relief is formed by pressing a digital embossing plate against the top layer of the decorative workpiece or nested decorative workpiece. A digital embossing plate can be made by UV curable inkjet technology so that the relief corresponds to the background image printed on the substrate web. An advantage of inkjet over gravure printing is that the background image, e.g. a wood grain image, can be varied infinitely so that no repeating decorative laminate panels occur in a room. By using a digital embossing plate, a variation in the inkjet printed decorative image can be constantly matched by a variation in the relief.

A digital embossing plate is a plate, which comprises elevations that can be used to form a relief on decorative laminate panel by pressing the digital embossing plate against the protective layer. The elevations may be cured inkjet droplets, jetted by an inkjet print device, and most preferably UV cured inkjet droplets. The elevations are preferably formed by printing and curing inkjet droplets on top of already cured or pin-cured inkjet droplets. The plate is preferably stiff by using metal or hard plastic.

An alternative of a digital embossing plate may be a digital embossing cylinder which is a cylinder that comprises the elevations to form a relief on decorative laminate by pressing and rotating the digital embossing cylinder against the top layer of the decorative laminate board. The elevations on the digital embossing cylinder are preferably cured inkjet droplets, jetted by an inkjet print device, and most preferably UV cured inkjet droplets. The elevations are preferably formed by printing and curing inkjet droplets on top of already cured or pin-cured inkjet droplets.

In a preferred embodiment, the decorative panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special embodiment the length of the panels exceeds 2 meter, with the width being preferably about 0.2 meter or more. The print of such panels is preferably free from repetitions.

Decorative Layers

The decorative layer includes a thermosetting resin impregnated paper and a personalized or customized decorative image printed thereon by inkjet. It is preferably prepared by an inkjet printing on a paper substrate web, followed by impregnation with a thermosetting resin.

Core Layers

The core layer is preferably made of wood-based materials, such as particle board, MDF or HDF (Medium Density Fibreboard or High Density Fibreboard), Oriented Strand Board (OSB) or the like. Also, use can be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, e.g. as described in U.S. Pat. No. 4,952,277 (BET PAPERCHEM).

In another preferred embodiment, the core layer is a board material composed substantially of wood fibres which are bonded by means of a polycondensation glue, wherein the polycondensation glue forms 5 to 20 percent by weight of the board material and the wood fibres are obtained for at least 40 percent by weight from recycled wood. Suitable examples are disclosed by EP 2374588 A (UNILIN).

Other preferred core layers and their manufacturing are disclosed by US 2011311806 (UNILIN) and U.S. Pat. No. 6,773,799 (DECORATIVE SURFACES).

The thickness of the core layer is preferably between 2 and 12 mm, more preferably between 5 and 10 mm.

Paper Substrates

The decorative layer and preferably also the protective layer include paper as substrate. When present also the balancing layer preferably includes paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 130 g/m$^2$ and preferably between 70 and 130 g/m$^2$. The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 25 seconds. Such porosity allows even for a heavy sheet of more than 150 g/m$^2$ to be readily impregnated with a relatively high amount of resin.

Suitable paper sheets having high porosity and their manufacturing are also disclosed by U.S. Pat. No. 6,709,764 (ARJO WIGGINS).

The paper for the decorative layer is preferably a white paper and may include one or more whitening agents, such as titanium dioxide, calcium carbonate and the like. The presence of a whitening agent helps to mask differences in colour on the core layer that can cause undesired colour effects on the decorative image.

Alternatively, the paper for the decorative layer may be a bulk coloured paper including one or more colour dyes and/or colour pigments. Besides the masking of differences in colour on the core layer, the use of a coloured paper reduces the amount of inkjet ink required to print the decorative image. For example, a light brown or grey paper may be used for printing a wood motif as background image in order to reduce the amount of inkjet ink needed.

In a preferred embodiment, unbleached Kraft paper is used for a brownish coloured paper in the decorative layer. Kraft paper has a low lignin content resulting in a high tensile strength. A preferred type of Kraft paper is absorbent Kraft paper of 40 to 135 g/m$^2$ having a high porosity and made from clean low kappa hardwood Kraft of good uniformity.

If the protective layer includes a paper, then a paper is used which becomes transparent or translucent after resin impregnation and heat pressing so that the decorative image of the decorative layer can be viewed.

Thermosetting Resins

The thermosetting resin is preferably selected from the group consisting of melamine-formaldehyde based resins, ureum-formaldehyde based resins and phenol-formaldehyde based resins. Other suitable resins for impregnating the paper are listed in [0028] of EP 2274485 A (HUELSTA).

Most preferably, the thermosetting resin is a melamine-formaldehyde based resin, often simply referred to in the art as a 'melamine (based) resin'.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. The created water, as well as any water residue in the thermosetting resin before the pressing, must leave the hardening resin layer to a large extent before being trapped and leading to a loss of transparency in the hardened layer. The available ink layer can hinder the diffusion of the vapour bubbles to the surface, however the present invention provides measures for limiting such hindrance.

The paper is preferably provided with an amount of thermosetting resin equaling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

The paper is preferably provided with such an amount of thermosetting resin, that at least the paper core is satisfied with the resin. Such satisfaction can be reached when an amount of resin is provided that corresponds to at least 1.5 or at least 2 times the paper weight. Preferably the paper is firstly impregnated through or satisfied, and, afterwards, at least at the side thereof to be printed, resin is partially removed.

Preferably the resin provided on said paper is in a B-stage while printing. Such B-stage exists when the thermosetting resin is not completely cross linked.

Preferably, the resin provided on said paper has a relative humidity lower than 15%, and still better of 10% by weight or lower while printing.

Preferably, the step of providing said paper with thermosetting resin involves applying a mixture of water and the resin on the paper. The application of the mixture might involve immersion of the paper in a bath of the mixture. Preferably, the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS) and EP 966641 A (VITS).

The dry resin content of the mixture of water and resin for impregnation depends on the type of resin. An aqueous solution containing a phenol-formaldehyde resin preferably has a dry resin content of about 30% by weight, while an aqueous solution containing a melamine-formaldehyde resin preferably has a dry resin content of about 60% by weight. Methods of impregnation with such solutions are disclosed by e.g. U.S. Pat. No. 6,773,799 (DECORATIVE SURFACES).

The paper is preferably impregnated with the mixtures known from U.S. Pat. No. 4,109,043 (FORMICA CORP) and U.S. Pat. No. 4,112,169 (FORMICA CORP), and hence preferably comprise, next to melamine formaldehyde resin, also polyurethane resin and/or acrylic resin.

The mixture including the thermosetting resin may further include additives, such as colorants, surface active ingredients, biocides, antistatic agents, hard particles for wear resistance, elastomers, UV absorbers, organic solvents, acids, bases, and the like.

The advantage of adding a colorant to the mixture containing the thermosetting resin is that a single type of white paper can be used for manufacturing the decorative layer, thereby reducing the stock of paper for the decorative laminate manufacturer. The use of a colored paper, as already described above, to reduce the amount of ink required for printing a decorative image, is here accomplished by a white paper being colored by impregnation using a brownish thermosetting resin. The latter allows a better control of the amount of brown colour required for certain wood motifs.

Antistatic agents may be used in thermosetting resin. However preferably antistatic agents, like NaCl and KCl, carbon particles and metal particles, are absent in the resin, because often they have undesired side effects such as a lower water resistance or a lower transparency. Other suitable antistatic agents are disclosed by EP 1567334 A (FLOORING IND).

Hard particles for wear resistance are preferably included in paper for a protective layer.

Ink-Receiving Layers

For preparing the decorative layer, aqueous pigmented inkjet inks are preferably inkjet printed on one or more ink-receiving layers present on a paper substrate. It is also possible to omit the one or more ink-receiving layers by using a polymer latex binder in the aqueous pigmented inkjet inks. However, most preferably one or more ink-receiving layers are used for maximizing the image quality. An inkjet printed paper substrate web is thereafter impregnated by a thermosetting resin.

The ink-receiving layer may consist of a single layer or of two, three or more layers, wherein each may have a different composition.

A single ink-receiving layer may be used, but preferably at least two ink-receiving layers. An ink-receiving layer preferably includes a polymeric binder and, for fast drying of the inkjet printed ink, preferably also an inorganic pigment.

A particularly preferred ink-receiving layer contains a polyvinylalcohol and an inorganic pigment, preferably a silica-based pigment.

In a preferred embodiment, one or more of the ink-receiving layers contain an inorganic pigment and a polymeric binder having a weight ratio P/B of inorganic pigment P to polymeric binder B of larger than 1.5, preferably larger than 3.0. The inorganic pigment may be a single type of inorganic pigment or a plurality of different inorganic pigments. The polymeric binder may be a single type of polymeric binder or a plurality of different polymeric binders.

By using a large weight ratio P/B, sometimes dust problems caused by the inorganic pigment may occur in the manufacturing process. This is especially critical during the inkjet printing as it may damage the inkjet print heads. In order to avoid this preferably at least two inkjet receiving layers are present on the paper substrate, wherein an outermost ink-receiving layer has no or a smaller content of inorganic pigment than an ink-receiving layer between the paper substrate web and the outermost ink-receiving layer.

In a preferred embodiment, the one or more ink-receiving layers have a total dry weight between 2.0 g/m$^2$ and 10.0 g/m$^2$, more preferably between 3.0 and 6.0 g/m$^2$.

In a preferred embodiment, the ink-receiving layer includes a polymeric binder selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar.

In a particularly preferred embodiment, the ink-receiving layer includes a polymeric binder, preferably a water soluble polymeric binder (>1 g/L water), which has a hydroxyl group as a hydrophilic structural unit, e.g. a polyvinyl alcohol.

A preferred polymer for the ink-receiving layer is a polyvinylalcohol (PVA), a vinylalcohol copolymer or a modified polyvinyl alcohol. The modified polyvinyl alcohol may be a cationic type polyvinyl alcohol, such as the cationic polyvinyl alcohol grades from Kuraray, such as POVAL C506, POVAL C118 from Nippon Goshei.

The pigment in the ink-receiving layer is an inorganic pigment, which can be chosen from neutral, anionic and cationic pigment types. Useful pigments include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides.

The inorganic pigment is preferably selected from the group consisting of alumina hydrates, aluminum oxides, aluminum hydroxides, aluminum silicates, and silicas.

Particularly preferred inorganic pigments are silica particles, colloidal silica, alumina particles and pseudo-boehmite, as they form better porous structures. When used herein, the particles may be primary particles directly used as they are, or they may form secondary particles. Preferably, the particles have an average primary particle diameter of 2 µm or less, and more preferably 200 nm or less.

A preferred type of alumina hydrate is crystalline boehmite, or γ-AlO(OH). Useful types of boehmite include DISPERAL HP14, DISPERAL 40, DISPAL 23N4-20, DISPAL 14N-25 and DISPERAL AL25 from Sasol; and MARTOXIN VPP2000-2 and GL-3 from Martinswerk GmbH Useful cationic aluminum oxide (alumina) types include α-$Al_2O_3$ types, such as NORTON E700, available from Saint-Gobain Ceramics & Plastics, Inc, and γ-$Al_2O_3$ types, such as ALUMINUM OXID C from Degussa.

Other useful inorganic pigments include aluminum trihydroxides such as Bayerite, or α-$Al(OH)_3$, such as PLURAL BT, available from Sasol, and Gibbsite, or γ-$Al(OH)_3$, such as MARTINAL grades and MARTIFIN grades from Martinswerk GmbH, MICRAL grades from JM Huber company; HIGILITE grades from Showa Denka K.K.

Another preferred type of inorganic pigment is silica which can be used as such, in its anionic form or after cationic modification. The silica can be chosen from different types, such as crystalline silica, amorphous silica, precipitated silica, fumed silica, silica gel, spherical and nonspherical silica. The silica may contain minor amounts of metal oxides from the group Al, Zr, Ti. Useful types include AEROSIL OX50 (BET surface area 50±15 $m^2/g$, average primary particle size 40 nm, $SiO_2$ content >99.8%, $Al_2O_3$ content <0.08%), AEROSIL MOX170 (BET surface area 170 $g/m^2$, average primary particle size 15 nm, $SiO_2$ content >98.3%, $Al_2O_3$ content 0.3-1.3%), AEROSIL MOX80 (BET surface area 80±20 $g/m^2$, average primary particle size 30 nm, $SiO_2$ content >98.3%, $Al_2O_3$ content 0.3-1.3%), or other hydrophilic AEROSIL grades available from Degussa-Hüls AG, which may give aqueous dispersions with a small average particle size (<500 nm).

Generally depending on their production method, silica particles are grouped into two types, wet-process particles and dry-process (vapour phase-process or fumed) particles.

In the wet process, active silica is formed through acidolysis of silicates, and this is polymerized to a suitable degree and flocculated to obtain hydrous silica.

A vapour-phase process includes two types; one includes high-temperature vapour-phase hydrolysis of silicon halide to obtain anhydrous silica (flame hydrolysis), and the other includes thermal reduction vaporization of silica sand and coke in an electric furnace followed by oxidizing it in air to also obtain anhydrous silica (arc process). The "fumed silica" means to indicate anhydrous silica particles obtained in the vapour-phase process.

For the silica particles used in the invention, especially preferred are the fumed silica particles. The fumed silica differs from hydrous silica in point of the density of the surface silanol group and of the presence or absence of pores therein, and the two different types of silica have different properties. The fumed silica is suitable for forming a three-dimensional structure of high porosity. Since the fumed silica has a particularly large specific surface area, its ink absorption and retention are high. Preferably, the vapour-phase silica has an average primary particle diameter of 30 nm or less, more preferably 20 nm or less, even more preferably 10 nm or less, and most preferably from 3 to 10 nm. The fumed silica particles readily aggregate through hydrogen bonding at the silanol groups therein. Therefore, when their mean primary particle size is not larger than 30 nm, the silica particles may form a structure of high porosity.

In a further preferred embodiment, an ink-receiving layer may be crosslinked. Any suitable crosslinker known in the prior art can be used. Boric acid is particularly preferred as crosslinker for the one or more ink-receiving layers used in the present invention.

The ink-receiving layer(s) may include other additives, such as colorants, surfactants, biocides, antistatic agents, hard particles for wear resistance, elastomers, UV absorbers, organic solvents, plasticizers, light-stabilizers, pH adjusters, antistatic agents, whitening agents, matting agents and the like.

The ink-receiving layer(s) can be coated onto the paper substrate by any conventional coating technique, such as dip coating, knife coating, extrusion coating, spin coating, slide hopper coating and curtain coating.

Alternatively the ink-receiving layer(s) can also be applied by a printing techniques, such as flexographic printing or valvejet printing.

Protective Layers

Preferably, a protective layer is applied above the decorative image by way of an overlay, i.e. a resin provided carrier, or a liquid coating, preferably while the decorative layer is laying on the core layer, either loosely or already connected or adhered thereto.

In a preferred embodiment, the carrier of the overlay is a paper impregnated by a thermosetting resin that becomes transparent or translucent after heat pressing in a DPL process.

A preferred method for manufacturing such an overlay is described in US 2009208646 (DEKOR KUNSTSTOFFE).

The liquid coating includes preferably a thermosetting resin, but may also be another type of liquid such as a UV- or an EB-curable varnish.

In a particularly preferred embodiment, the liquid coating includes a melamine resin and hard particles, like corundum.

The protective layer is preferably the outermost layer, but in another embodiment a thermoplastic or elastomeric surface layer may be coated on the protective layer, preferably of pure thermoplastic or elastomeric material. In the latter case, preferably a thermoplastic or elastomeric material based layer is also applied on the other side of the core layer.

Liquid melamine coatings are exemplified in DE 19725829 C (LS INDUSTRIELACKE) and U.S. Pat. No. 3,173,804 (RENKL PAIDIWERK).

The liquid coating may contain hard particles, preferably transparent hard particles. Suitable liquid coatings for wear protection containing hard particles and methods for manufacturing such a protective layer are disclosed by US 2011300372 (CT FOR ABRASIVES AND REFRACTORIES) and U.S. Pat. No. 8,410,209 (CT FOR ABRASIVES AND REFRACTORIES).

The transparency and also the colour of the protective layer can be controlled by the hard particles, when they comprise one or a plurality of oxides, oxide nitrides or mixed oxides from the group of elements Li, Na, K, Ca, Mg, Ba, Sr, Zn, Al, Si, Ti, Nb, La, Y, Ce or B.

The total quantity of hard particles and transparent solid material particles is typically between 5% by volume and 70% by volume, based on the total volume of the liquid coating. The total quantity of hard particles is between 1 $g/m^2$ and 100 $g/m^2$, preferably 2 $g/m^2$ to 50 $g/m^2$.

If the protective layer includes a paper as carrier sheet for the thermosetting resin, then the hard particles, such as aluminium oxide particles, are preferably incorporated in or on the paper. Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

The amount of hard particles in the protective layer may be determined in function of the desired wear resistance, preferably by a so-called Taber test as defined in EN 13329 and also disclosed in WO 2013/050910 A (UNILIN) and U.S. Pat. No. 8,410,209 (CT FOR ABRASIVES AND REFRACTOR).

Hard particles having an average particle size of between 1 and 200 µm are preferred. Preferably an amount of such particles of between 1 and 40 $g/m^2$ is applied above the printed image. An amount lower than 20 $g/m^2$ can suffice for the lower qualities.

If the protective layer includes a paper, then it preferably has a paper weight of between 10 and 50 $g/m^2$. Such a paper is often also referred to as a so-called overlay commonly used in laminate panels. Preferred methods for manufacturing such an overlay are disclosed by WO 2007/144718 (FLOORING IND).

Preferably, the step of providing the protective layer of thermosetting resin above the printed image involves a press treatment. Preferably, a temperature above 150° C. is applied in the press treatment, more preferably between 180° and 220° C., and a pressure of more than 20 bar, more preferably between 35 and 40 bar.

Balancing Layers

The main purpose of the balancing layer(s) is to compensate tensile forces by layers on the opposite side of the core layer, so that an essentially flat decorative panel is obtained. Such a balancing layer is preferably a thermosetting resin layer that can comprise one or more carrier layers, such as paper sheets.

As already explained above for a furniture panel, the balancing layer(s) may be a decorative layer, optionally complemented by a protective layer.

Instead of one or more transparent balancing layers, also an opaque balancing layer may be used which gives the decorative panel a more appealing look by masking surface irregularities. Additionally, it may contain text or graphical information such as a company logo or text information.

Thermoplastic Laminate Panels

A decorative panel of the thermoplastic laminate type includes an inkjet printed decorative image between two thermoplastic foils, wherein at least one of the two thermoplastic foils is a transparent foil. A transparent foil is necessary to make the inkjet printed decorative image viewable as it is located on the inside of the decorative laminate.

Thermoplastic laminate panels have been developed more recently than wood-based laminate panels in order to solve issues of water resistance.

The thermoplastic laminate panels are obtained by heat pressing the inkjet printed thermoplastic substrate with a protective layer into a decorative laminate; and cutting the decorative laminate into decorative laminate panels. Suitable manufacturing methods are disclosed by EP 3095614 A (AGFA GRAPHICS) and EP 3119614 A (UNILIN).

In a preferred embodiment, the first and second thermoplastic foils are polyvinyl chloride foils. A layer containing a vinylchloride-vinylacetate-vinylalcohol copolymer may be coated onto the second thermoplastic foil or on the decorative image. The latter improves the adhesion strength between the first and second thermoplastic foil when the decorative image is facing the coated layer during heat pressing.

The polyvinylchloride foils are preferably of the rigid type including less than 10 wt % of plasticizer, more preferably these PVC foils contain 0 to 5 wt % of plasticizer. The plasticizer may be a phthalate plasticizer, but is preferably a non-phthalate plasticizer for health reasons. PVC foils are extremely suitable for water resistance, so that the decorative surfaces can be used in bathrooms and kitchens.

Preferred non-phthalate plasticizers include diisononyl cyclohexane-1,2-dicarboxylate (DINCH), dipropylene glycol dibenzoate (DGD), diethylene glycol dibenzoate (DEGD), triethylene glycol dibenzoate (TEGD), acetylated monoglycerides of fully hydrogenated castor oil (COMGHA) isosorbide esters, bis-(2-ethylhexyl) terephthalate, vegetable oil based plasticizers like Ecolibrium™ from DOW, and blends thereof.

Preferably, a layer containing a vinylchloride-vinylacetate-vinylalcohol is coated onto the first thermoplastic foil carrying an at least partially UV cured decorative image and incompletely drying the layer so that it remains tacky, a second thermoplastic foil will adhere to it by pressure alone. However, if the intended use is not wall decoration but decorative panels for a floor, then the preferably the foils are fused together by heat pressing.

The foils are thermoplastic so that they can be fused together. In a preferred embodiment, the first and second thermoplastic foils are heat pressed into a decorative laminate, preferably at temperatures above 130° C. or even 150° C. Heat pressing is preferably performed by preheating the first and second thermoplastic foils preferably to a temperature above 130° C., more preferably between 140 and 200° C., and preferably then using a cooled press to fuse them into a decorative laminate. Alternatively, the press containing the first and second thermoplastic foils may be heated to a temperature above 130° C., followed by cooling the press to fuse the first and second thermoplastic foils into a decorative laminate. The pressure used in both methods is preferably more than 10 bar, more preferably between 15 and 40 bar.

In one embodiment, the decorative panel includes an inkjet printed decorative image on a first thermoplastic foil, which is preferably an opaque white thermoplastic foil, while the second thermoplastic foil is transparent and carrying a layer containing a vinylchloride-vinylacetate-vinylalcohol copolymer.

In an alternative preferred embodiment, the decorative panel includes an inkjet printed decorative image on an opaque white first thermoplastic foil, and the layer containing a vinylchloride-vinylacetate-vinylalcohol copolymer is applied directly onto inkjet printed decorative image. No layer containing a vinylchloride-vinylacetate-vinylalcohol copolymer is then needed for the second thermoplastic foil.

This approach results in a shelf-life advantage for the second thermoplastic foil by avoiding stickiness due to the layer containing a vinylchloride-vinylacetate-vinylalcohol copolymer being in contact with the uncoated surface of the second thermoplastic foil on a roll.

The advantage of having an opaque white thermoplastic foil is that the colour vividness of the inkjet printed decorative image is enhanced and that any defects and irregularities in the optional base layer are masked and thus cannot influence image quality. The opaque thermoplastic foil is preferably a white opaque thermoplastic foil, but may also be a yellowish or brownish opaque thermoplastic foil for reducing ink consumption during inkjet printing.

In a preferred embodiment, the decorative panel includes a tongue and groove for glue-less interlocking with decorative panels having a similar tongue and groove. In a more preferred embodiment, the tongue and groove are part of the base layer.

Decorative panels including a tongue and a groove of a special shape (see FIG. 7) can be clicked into one another. The advantage thereof is a fast and easy assembly of a floor or wall requiring no glue. The shape of the tongue and groove necessary for obtaining a good mechanical join is well-known in the art of wood laminate flooring, as exemplified in EP 2280130 A (FLOORING IND), WO 2004/053258 (FLOORING IND), US 2008010937 (VALINGE) and U.S. Pat. No. 6,418,683 (PERSTORP FLOORING).

The decorative panels may have any desired shape such as a square, a rectangle or an octagon. For flooring, the decorative panels preferably have a rectangular shape, for example, 18 cm×140 cm, and a thickness of 2 to 6 mm. At a thickness of no more than 6 mm, a large floor surface can be covered by a rather limited total weight of decorative panels. The low weight increases comfort when installing the decorative panels and causes a financial benefit in transport to warehouses compared to heavier wood based decorative panels.

In a preferred embodiment, the decorative panels are made in the form of rectangular oblong strips. The dimensions thereof may vary greatly. Preferably, the panels have a length exceeding 1 meter, and a width exceeding 0.1 meter, e.g. the panels can be about 1.3 meter long and about 0.15 meter wide. According to a special embodiment, the length of the panels exceeds 2 meter, with the width being preferably about 0.2 meter or more. The print of such panels is preferably free from repetitions.

The decorative panels may further include a sound-absorbing layer. An example of such a sound-absorbing layer is disclosed by U.S. Pat. No. 8,196,366 (UNILIN).

First Thermoplastic Foil

The first thermoplastic foil includes the personalized or customized decorative image.

The first thermoplastic foil preferably has a thickness of at least 80 µm. When the inkjet image is printed on a transparent thermoplastic foil used as a protective layer of the decorative laminate, it preferably has a thickness of more than 100 µm, more preferably 200 to 700 µm, and most preferably 300 to 500 µm.

If the first thermoplastic foil is used as a protective outer layer of the decorative laminate, it may include additional finishing layers on its surface as described here below for the second thermoplastic foil.

Second Thermoplastic Foil

The second thermoplastic foil may carry a layer containing a vinylchloride-vinylacetate-vinylalcohol copolymer. Such a layer assures optimal adhesion to the inkjet printed decorative image while the flexibility can be maximized by using pigmented UV curable inkjet inks having high amounts of polymerizable compounds with one ethylenically unsaturated polymerizable group in the polymerizable composition of the inkjet inks. The layer preferably includes a vinylchloride-vinylacetate-vinylalcohol copolymer containing more than 80 wt % of vinyl chloride and 1 to 15 wt % of vinylalcohol on the total weight of the copolymer. If the second thermoplastic foil carries no layer containing a vinylchloride-vinylacetate-vinylalcohol copolymer, then the layer is preferably coated on the inkjet printed decorative image of the first thermoplastic foil. Another advantage of including the vinylalcohol in the specific vinylchloride-vinylacetate copolymer is that the layer becomes not tacky and the second thermoplastic foil can be stored as a roll without causing issues of stickiness.

The application of the layer containing a vinylchloride-vinylacetate-vinylalcohol copolymer is preferably performed using a coating technique selected from spray coating, dip coating, knife coating, extrusion coating, spin coating, slide hopper coating and curtain coating.

The layer containing a vinylchloride-vinylacetate-vinylalcohol copolymer is applied to have a dry weight of preferably 1 to 10 $g/m^2$, more preferably 2 to 7 $g/m^2$, and most preferably 3 to 6 $g/m^2$. Less than 1 $g/m^2$ did not provide good adhesion, while above 10 $g/m^2$ problems of tackiness and stickiness could again be observed. A very consistent quality was obtained when coated at a dry weight of 2 to 6 $g/m^2$.

A coating solution of the vinylchloride-vinylacetate-vinylalcohol copolymer is preferably made using an organic solvent having a boiling point of no more than 95° C. at normal pressure. This allows for fast drying which is especially needed in a set-up of a single-pass inkjet printing process. The organic solvent for the vinylchloride-vinylacetate-vinylalcohol copolymer is preferably selected from methyl ethyl ketone or ethyl acetate for minimizing explosion risk.

The second thermoplastic foil is preferably used in the decorative laminate as the outer layer, thus forming a transparant protective layer for having a viewable inkjet image. However, additional finishing layers may be applied upon the protective layer.

In a preferred embodiment, an antistatic layer is applied on the protective layer. Techniques to render decorative panels antistatic are well-known in the art of decorative laminates as exemplified by EP 1567334 A (FLOORING IND).

In a particular preferred embodiment, the decorative panel has a polyurethane finishing layer on the protective layer.

The top surface of the decorative surface, i.e. at least the protective layer, is preferably provided with a relief matching the decorative image, such as for example the wood grain, cracks and knots in a woodprint. Embossing techniques to accomplish such relief are well-known in the art of flooring panels as disclosed by, for example, EP 1290290 A (FLOORING IND), US 2006144004 (UNILIN), EP 1711353 A (FLOORING IND) and US 2010192793 (FLOORING IND).

Most preferably, the relief is formed by pressing a digital embossing plate, cylinder or belt against the thermoplastic foil forming the protective layer during heat-pressing.

A digital embossing plate is a plate that comprises elevations that can be used to form a relief on decorative panel by pressing the digital embossing plate against the protective layer of the decorative laminate. The elevations may be cured inkjet droplets, jetted by an inkjet print device, and most preferably UV cured inkjet droplets. The elevations are preferably formed by printing and curing inkjet droplets on top of already cured or pin-cured inkjet droplets. The plate is preferably stiff by using metal or hard plastic.

An alternative of a digital embossing plate may be a digital embossing cylinder which is a cylinder that comprises the elevations to form a relief on decorative panels by pressing and rotating the digital embossing cylinder against the protective layer of the decorative panels.

A finishing layer, preferably a polyurethane finishing layer, may include hard particles, like corundum, for preventing scratching of the top surface. The total quantity of hard particles is preferably between 1 g/m$^2$ and 100 g/m$^2$, preferably 2 g/m$^2$ to 50 g/m$^2$.

Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

The amount of hard particles may determined in function of the desired scratch resistance.

Hard particles having an average particle size of between 1 and 200 μm are preferred. Preferably an amount of such particles of between 1 and 40 g/m$^2$ is applied above the printed image. An amount lower than 20 g/m$^2$ can suffice for the lower qualities.

The second thermoplastic foil preferably has a thickness of at least 80 μm.

When the second thermoplastic foil is used as a protective outer layer of the decorative laminate, it preferably has a thickness of more than 100 μm, more preferably 200 to 700 μm, and most preferably 300 to 500 μm.

Base Layers

The decorative panel of the thermoplastic laminate type preferably includes a base layer. The base layer provides sufficient rigidness to the decorative panel, so that when e.g. a long rectangular decorative panel bends under its own weight, the panel does not break. For this reason, the base layer is preferably reinforced with fibres.

In a decorative panel, the base layer is attached to the side of the opaque thermoplastic foil of the first and second thermoplastic foils or attached to the side of a transparent thermoplastic foil if both the first and second thermoplastic foils are transparent thermoplastic foils.

In a preferred embodiment, the base layer includes substantially polyvinyl chloride and reinforcing materials. More preferably, the base layer includes substantially polyvinyl chloride and glass fibres.

The base layer may be composed of two foils, preferably polyvinyl chloride foils, interposed by a glass fibre fleece.

The base layer may contain mineral. Particularly suitable herein are as talc or calcium carbonate (chalk), aluminum oxide, silica. The base layer may include a flame retardant.

The base layer may also be a so-called wood plastic composite (WPC), preferably containing one or more polymers or copolymers selected from the group consisting polypropylene, polyethylene and polyvinyl chloride.

Inkjet Inks

The inkjet inks are preferably pigmented inkjet inks as the use of colour pigments provide higher light stability to the decorative laminate panels than dyes. The inkjet inks used for manufacturing wood-based laminate panels are pigmented aqueous inkjet inks, while the inkjet inks used for manufacturing thermoplastic laminate panels are UV curable inkjet inks.

An aqueous inkjet ink preferably includes at least a colour pigment and water, more preferably completed with one or more organic solvents such as humectants, and a dispersant if the colour pigment is not a self-dispersible colour pigment.

A UV curable inkjet ink preferably includes at least a colour pigment, a polymeric dispersant, a photoinitiator and a polymerizable compound, such as a monomer or oligomer.

The inkjet inks are composed into an inkjet ink set having differently coloured inkjet inks. The inkjet ink set may be a standard CMYK ink set, but is preferably a CRYK ink set wherein the magenta (M) ink is replaced by red (R) inkjet ink. The use of a red inkjet ink enhances the colour gamut for wood based background images, which represent the majority of decorative laminates in flooring laminates.

The inkjet ink set may be extended with extra inks such as white, brown, red, green, blue, and/or orange to further enlarge the colour gamut of the image. The inkjet ink set may also be extended by the combination of the full density inkjet inks with light density inkjet inks. The combination of dark and light colour inks and/or black and grey inks improves the image quality by a lowered graininess. However preferably the inkjet ink set consists of no more than 3 or 4 inkjet inks, allowing the design of multi-pass and single pass inkjet printers of high throughput at acceptable cost.

Colorants

The colorant in an inkjet ink may include a dye, but preferably consists of a colour pigment. The pigmented inkjet ink preferably contains a dispersant, more preferably a polymeric dispersant, for dispersing the pigment. In addition to the polymeric dispersant, the pigmented inkjet ink may contain a dispersion synergist to further improve the dispersion quality and stability of the ink.

In a pigmented aqueous inkjet ink, the aqueous inkjet ink may contain a so-called "self dispersible" colour pigment. A self-dispersible colour pigment requires no dispersant, because the pigment surface has ionic groups which realize electrostatic stabilization of the pigment dispersion. In case of self-dispersible colour pigments, the steric stabilization obtained by using a polymeric dispersant becomes optional. The preparation of self-dispersible colour pigments is well-known in the art and can be exemplified by EP 904327 A (CABOT).

The colour pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

A particularly preferred pigment for a cyan inkjet ink is a copper phthalocyanine pigment, more preferably C.I. Pigment Blue 15:3 or C.I. Pigment Blue 15:4.

Particularly preferred pigments for a red inkjet ink are C.I Pigment Red 254, C.I. Pigment Red 176 and C.I. Pigment Red 122, and mixed crystals thereof.

Particularly preferred pigments for yellow inkjet ink are C.I. Pigment Yellow 150, C.I. Pigment Yellow 151, C.I. Pigment Yellow 180 and C.I. Pigment Yellow 74, and mixed crystals thereof.

For the black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the inkjet ink includes a carbon black pigment and at least one pigment selected from the group consisting of a blue pigment, a cyan pigment, magenta pigment and a red pigment. It was found that such a black inkjet ink allowed easier and better colour management for wood colours.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink should be between 0.005 μm and 15 μm. Preferably, the average pigment particle size is between 0.005 and 5 μm, more preferably between 0.005 and 1 μm, particularly preferably between 0.005 and 0.3 μm and most preferably between 0.040 and 0.150 μm.

The pigment is used in the pigmented inkjet ink in an amount of 0.1 to 20 wt %, preferably 1 to 10 wt %, and most preferably 2 to 5 wt % based on the total weight of the pigmented inkjet ink. A pigment concentration of at least 2 wt % is preferred to reduce the amount of inkjet ink needed to produce the colour image, while a pigment concentration higher than 5 wt % reduces the colour gamut for printing the colour image with print heads having a nozzle diameter of 20 to 50 μm.

Dispersants

The pigmented inkjet ink may contain a dispersant, preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

In a preferred embodiment, the polymeric dispersant used in an aqueous pigmented inkjet ink is a copolymer comprising between 3 and 11 mol % of a long aliphatic chain (meth)acrylate wherein the long aliphatic chain contains at least 10 carbon atoms. The long aliphatic chain (meth) acrylate contains preferably 10 to 18 carbon atoms. The long aliphatic chain (meth)acrylate is preferably decyl (meth) acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms. A commercially available polymeric dispersant being a copolymer comprising between 3 and 11 mol % of a long aliphatic chain (meth)acrylate is Edaplan™ 482, a polymeric dispersant from MUNZING.

Particularly preferred polymeric dispersants for UV curable inkjet inks include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON.

Polymer Latex Binders

Aqueous inkjet inks may contain a polymeric latex binder. By using such a latex, the one or more ink receiving layers on a paper substrate can be omitted with only minor loss in image quality.

The polymer latex is not particularly limited as long as it has stable dispersibility in the ink composition. There is no limitation on the main chain skeleton of the water-insoluble polymer. Examples of the polymer include a vinyl polymer and a condensed polymer (e.g., an epoxy resin, polyester, polyurethane, polyamide, cellulose, polyether, polyurea, polyimide, and polycarbonate). Among the above, a vinyl polymer is particularly preferable because of easily controlled synthesis.

In a particularly preferred embodiment the polymer latex is a polyurethane latex, more preferably a self-dispersible polyurethane latex. The polymer latex binder in the one or more aqueous inkjet inks is preferably a polyurethane based latex binder for reasons of compatibility with the thermosetting resin.

The polymer latex in the invention is preferably a self-dispersing polymer latex, and more preferably a self-dispersing polymer latex having a carboxyl group, from the viewpoint of ejecting stability and stability of the liquid (particularly, dispersion stability) when using a colour pigment. The self-dispersing polymer latex means a latex of a water-insoluble polymer that does not contain a free emulsifier and that can get into a dispersed state in an aqueous medium even in the absence of other surfactants due to a functional group (particularly, an acidic group or a salt thereof) that the polymer itself has.

In preparing a self-dispersing polymer latex, preferably a monomer is used selected from the group consisting of an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

The latex binder polymer particles preferably have a glass transition temperature (Tg) of 30° C. or more.

The minimum film-forming temperature (MFT) of the polymer latex is preferably −25 to 150° C., and more preferably 35 to 130° C.

Biocides

The aqueous inkjet ink preferably includes a biocide to prevent ink deterioration during storage by micro-organisms present in the water of the inkjet ink.

Suitable biocides for the aqueous inkjet inks include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added in an amount of 0.001 to 3.0 wt. %, more preferably 0.01 to 1.0 wt. %, each based on the total weight of the aqueous inkjet ink.

Humectants

A humectant may be used in the aqueous inkjet ink to prevent water evaporation from a nozzle in the inkjet print head that can result in a failing nozzle due to clogging.

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are 2-pyrrolidone, glycerol and 1,2-hexanediol, since the latter were found to be the most effective for improving inkjet printing reliability in an industrial environment.

The humectant is preferably added to the inkjet ink formulation in an amount of 0.1 to 40 wt % of the formulation, more preferably 1 to 30 wt % of the formulation, and most preferably 3 to 25 wt % of the formulation.

pH Adjusters

The aqueous inkjet inks may contain at least one pH adjuster. Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are triethanol amine, NaOH and H$_2$SO$_4$.

For dispersion stability, the aqueous inkjet ink preferably has a pH of at least 7.

Surfactants

The inkjet inks may contain at least one surfactant. The surfactant(s) can be anionic, cationic, non-ionic, or zwitterionic and are usually added in a total quantity less than 5 wt % based on the total weight of the inkjet ink and particularly in a total less than 2 wt % based on the total weight of the inkjet ink.

The inkjet inks preferably have a surface tension between 18.0 and 45.0 mN/m at 25° C., more preferably between a surface tension between 21.0 and 39.0 mN/m at 25° C.

Preferred surfactants are selected from fluoro surfactants (such as fluorinated hydrocarbons) and/or silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes. Preferred commercial silicone surfactants include BYK™ 333 and BYK™ UV3510 from BYK Chemie.

Preferred surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Silicone surfactants are often preferred in UV curable inkjet inks, especially the reactive silicone surfactants, which are able to be polymerized together with the polymerizable compounds during the curing step.

Examples of useful commercial silicone surfactants are those supplied by BYK CHEMIE GMBH (including Byk™-302, 307, 310, 331, 333, 341, 345, 346, 347, 348, UV3500, UV3510 and UV3530), those supplied by TEGO CHEMIE SERVICE (including Tego Rad™ 2100, 2200N, 2250, 2300, 2500, 2600 and 2700), Ebecryl™ 1360 a polysilixone hexaacrylate from CYTEC INDUSTRIES BV and Efka™-3000 series (including Efka™-3232 and Efka™-3883) from EFKA CHEMICALS B.V.

Polymerizable Compounds

A UV curable inkjet ink includes one or more monomers and/or oligomers. The UV curable inkjet ink is preferably a free radical UV curable inkjet ink.

Any monomer and oligomer capable of free radical polymerization may be used in the free radical UV curable inkjet ink. The monomers and oligomers may have different degrees of polymerizable functionality, and a mixture including combinations of mono-, di-, tri- and higher polymerizable functionality monomers may be used. The viscosity of the UV curable inkjet ink can be adjusted by varying the ratio between the monomers and oligomers.

Particularly preferred for use as a polymerizable compound in the UV curable inkjet ink are monofunctional and/or polyfunctional (meth)acrylate monomers, oligomers or prepolymers.

In a particularly preferred embodiment, the UV curable inkjet inks are free radical UV curable inkjet inks as it was found that such inks were more reliable than cationically UV curable inkjet inks in an industrial environment.

The UV curable inkjet ink preferably contains a polymerizable composition having: 30 to 90 wt % of one or more compounds with one ethylenically unsaturated polymerizable group; 10 to 70 wt % of one or more compounds with two ethylenically unsaturated polymerizable groups; and 0 to 10 wt % of one or more compounds with three or more ethylenically unsaturated polymerizable groups, wherein all weight percentages wt % are based upon the total weight of the polymerizable composition.

In a particularly preferred embodiment, the one or more pigmented UV curable inkjet inks include at least one monomer selected from N-vinyl-lactam and an acyclic-hydrocarbon monoacrylate. The latter combination improves the adhesion and flexibility further.

Photoinitiators

The UV curable pigment inkjet inks preferably contains a photoinitiator. The initiator typically initiates the polymerization reaction. The photoinitiator may be a Norrish type I initiator, a Norrish type II initiator or a photo-acid generator, but is preferably a Norrish type I initiator, a Norrish type II initiator or a combination thereof.

A preferred Norrish type I-initiator is selected from the group consisting of benzoinethers, benzil ketals, $\alpha,\alpha$-dialkoxyacetophenones, $\alpha$-hydroxyalkylphenones, $\alpha$-aminoalkylphenones, acylphosphine oxides, acylphosphine sulphides, $\alpha$-haloketones, $\alpha$-halosulfones and $\alpha$-halophenylglyoxalates.

A preferred Norrish type II-initiator is selected from the group consisting of benzophenones, thioxanthones, 1,2-diketones and anthraquinones.

Suitable photo-initiators are disclosed in CRIVELLO, J. V., et al. VOLUME III: Photoinitiators for Free Radical Cationic & Anionic Photopolymerization. 2nd edition. Edited by BRADLEY, G. London, UK: John Wiley and Sons Ltd, 1998. p. 287-294.

A preferred amount of photoinitiator is 0.3-20 wt % of the total weight of the UV curable inkjet ink, more preferably 1-15 wt % of the total weight of the UV curable inkjet ink.

In order to increase the photosensitivity further, the free radical UV curable inkjet ink may additionally contain co-initiators.

A preferred co-initiator is selected from the group consisting of an aliphatic amine, an aromatic amine and a thiol. Tertiary amines, heterocyclic thiols and 4-dialkylaminobenzoic acid are particularly preferred as co-initiator. The most preferred co-initiators are aminobenzoates for reason of shelf-life stability of the inkjet ink.

The amount of co-initiator or co-initiators is preferably from 0.01 to 20 wt %, more preferably from 0.05 to 10 wt %, based in each case on the total weight of the UV curable inkjet ink.

Polymerization Inhibitors

For improving the shelf-life of the inkjet ink, the UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total (inkjet) ink.

Preparation of Inkjet Inks

The inkjet inks may be prepared by precipitating or milling the colour pigment in the dispersion medium in the presence of the polymeric dispersant, or simply by mixing a self-dispersible colour pigment in the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode. UV curable inkjet inks are preferably prepared under conditions eliminating all possible incident UV light.

The preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water or a monomer. For ink-jet inks, the pigment is usually present in the mill grind at 1 to 50 wt %, excluding the milling media. The weight ratio of pigment over dispersant is 20:1 to 1:2.

The milling time can vary widely and depends upon the pigment, mechanical means and residence conditions selected, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application.

Inkjet Printing Devices

The inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However, the inkjet printing method according to the present invention is not restricted to piezoelectric inkjet printing. Other inkjet print heads can be used and include various types, such as a continuous type, a thermal print head type and a valve jet type.

The inkjet print head normally scans back and forth in a transversal direction across the moving ink-receiver surface. Often the inkjet print head does not print on the way back. Bi-directional printing, also known as multi-pass printing, is preferred for obtaining a high areal throughput. Another preferred printing method is by a "single pass printing process", which can be performed by using page wide inkjet print heads or multiple staggered inkjet print heads that cover the entire width of the ink-receiver surface. In a single pass printing process the inkjet print heads usually remain stationary and the substrate surface is transported under the inkjet print heads.

An inkjet printing device printing with aqueous pigmented inkjet inks includes, in order, at least one inkjet print head and a drying device for evaporating the water and optionally organic solvents of the jetted ink.

An inkjet printing device printing with UV curable inkjet inks contains, in order, at least one inkjet print head and a UV curing device for UV curing the jetted ink. The UV curing device preferably includes UV LEDs.

The inkjet printing device may be incorporated into the laminate manufacturing line or it may be present at a different location, such as the décor printer.

In a preferred embodiment, the inkjet printing device is incorporated into the manufacturing line of decorative laminates. The advantage is that shorter delivery times to the customer can be achieved.

Drying Devices

A dryer may be included in the inkjet printing device for removing at least part of the aqueous medium of aqueous inkjet inks. Suitable dryers include devices circulating hot air, ovens, and devices using air suction.

The drying device may include a heat conduction device, such as a hot plate or a heat drum. A preferred heat drum is an induction heat drum.

The drying device may include an infrared radiation source. An effective infrared radiation source has an emission maximum between 0.8 and 1.5 μm. Such an infrared radiation source is sometimes called a NIR radiation source or NIR dryer.

NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

In a preferred embodiment, the NIR radiation source is in the form of NIR LEDs, which can be mounted easily on a shuttling system of a plurality of inkjet print heads in a multipass inkjet printing device.

Another preferred drying device uses Carbon Infrared Radiation (CIR).

UV Curing Devices

The UV curing device emits UV radiation that is absorbed by the photoinitiator or photoinitiating system for polymerizing the polymerizable compounds of the core.

The UV curing device may include a high or low pressure mercury lamp, but preferably includes or consists of UV LEDs.

The UV curing device may be arranged in combination with the print head of the inkjet printer, travelling therewith so that the curing radiation is applied very shortly after jetting. Preferably such curing means consists of one or more UV LEDs, because in such an arrangement it can be difficult to provide other types of curing means that are small enough to be connected to and travelling with the print head. Alternatively, a static fixed radiation source may be employed, e.g. a source of curing UV-light, connected to the radiation source by means of flexible radiation conductive means, such as a fibre optic bundle or an internally reflective flexible tube, or by an arrangement of mirrors including a mirror upon the print head.

However, it is not necessary to have the UV light source connected to the print head. The source of UV radiation may, for example, also be an elongated radiation source extending transversely across the substrate to be cured. It may be adjacent to the transverse path of the print head so that subsequent rows of the decorative image formed by the print head are passed, stepwise or continually, beneath that radiation source.

Any ultraviolet light source, as long as part of the emitted light can be absorbed by the photoinitiator or photoinitiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen

REFERENCE SIGNS LIST

TABLE 2

| | |
|---|---|
| 1 | Decorative laminate board |
| 2 | Vertical cutting line |
| 3 | Horizontal cutting line |
| 4 | Decorative panel |
| 5 | Ground surface of room |
| 50 | Decorative laminate panel |
| 51 | Tongue |
| 52 | Groove |
| 53 | Protective layer |
| 54 | Decorative layer |
| 55 | Base layer |
| 60 | Decorative panel image |
| 61 | Extension zone |
| 62 | Distorted image |
| 63 | Close-up of part of distorted image |
| 64 | Undistorted image |
| 70 | Decorative laminate panel |
| 71 | Neighbouring decorative laminate panel |
| 72 | Tongue |
| 73 | Groove (not visible) |
| 74 | Missing part of tongue |
| 75 | Unmilled groove (not visible) |
| 101 | Ground floor |
| 102 | Entrance of shop |
| 103 | Personalized decorative surface |
| 104 | Floormarking Logo |
| 105 | Floormarking Reception |
| 106 | Floormarking Demo |
| 107 | Staggered array |
| 108 | Decorative panel image |
| 109 | Positioning code |
| 110 | Non-staggered digital layout |
| 111 | Position code digital layout |
| 112 | Substrate |
| 113 | Decorative laminate board |
| 114 | Heat press |
| 115 | Protective Layer |
| 116 | Decorative layer |
| 117 | Core layer |
| 118 | Balancing layer |
| 119 | Decorative laminate panel |
| 120 | Specific decorative laminate panel |
| 121 | Panel back-side |
| 122 | Tongue |
| 123 | Groove |
| 201 | Customer |
| 202 | Laminate order |
| 203 | Input device |
| 204 | Digital connection to input device |
| 205 | Computer |
| 206 | Digital connection to decor printer |
| 207 | Digital connection to laminate manufacturer |
| 211 | Paper manufacturer |
| 212 | Paper roll |
| 213 | Decor printer |
| 214 | Gravure printing |
| 215 | Inkjet printing |
| 216 | Decor Paper roll |
| 217 | Decor Paper warehouse |
| 218 | Impregnation |
| 219 | Cutting to size |
| 220 | Floor laminate manufacturer |
| 221 | Heat pressing |
| 222 | Laminate warehouse |
| 223 | Delivery |
| 224 | Floor laminate |

The invention claimed is:

1. A method for manufacturing a personalized or customized decorative surface (103) having decorative laminate panels (119), the method comprising:

segmenting a digital image of the personalized or customized decorative surface (103) according to a staggered array into a plurality of decorative laminate panel images (108), wherein each decorative laminate panel image (108) is sized to fit on a decorative laminate panel (119);

creating a non-staggered digital layout (110) of the plurality of decorative laminate panel images (108);

inkjet printing the non-staggered digital layout (11) on a substrate (112);

heat pressing the inkjet printed substrate into a decorative laminate (113); and dividing the decorative laminate (113) into decorative laminate panels (119).

2. The method of claim 1, further including the step of assigning a positioning code (109) to a decorative laminate panel image (108) for identifying its position in the digital image of the personalized or customized decorative surface (103).

3. The method of claim 2, wherein the front side of a decorative laminate panel (119) includes one of the plurality of inkjet printed decorative laminate panel images (108) and the back-side of the decorative laminate panel (119) includes the positioning code (109) of the decorative laminate panel image (108) inkjet printed on the front side of the decorative laminate panel (119).

4. The method of claim 2, wherein the positioning code (109) on the back-side of the decorative laminate panel is applied by inkjet printing or laser marking.

5. The method of claim 1, wherein the back-side of the decorative laminate panel includes customer details or an identification code for identifying a customer or his delivery address.

6. The method of claim 1, wherein the decorative laminate panel image (60) includes an extension zone (61), which is removed in the decorative laminate panel (50, 70), by providing a tongue (51, 72) or groove (52, 73) to the decorative laminate panel (50, 70).

7. The method of claim 6, wherein the extension zone (61) includes image data retrieved from neighbouring decorative laminate panel images in the digital image of the personalized or customized decorative surface.

8. The method of claim 1, wherein the substrate (112) is a paper substrate and the inkjet printing of the non-staggered digital layout (110) is performed by one or more aqueous pigmented inkjet inks on the substrate (112) before or after thermosetting resin impregnation.

9. The method of claim 8, wherein the one or more aqueous pigmented inkjet inks are inkjet printed on one or more ink-receiving layers present on the paper substrate.

10. The method of claim 1, wherein the positioning code (109) is inkjet printed on a paper substrate for forming a balancing layer (118) in the decorative laminate panel (119).

11. The method of claim 1, wherein the substrate (112) is a thermoplastic substrate based on a material selected from the group consisting of polyvinylchloride (PVC), polypropylene (PP), polyethylene (PE), polyethylene-terephthalate (PET), thermoplastic polyurethane (TPU) and combinations thereof.

12. The method of claim 11, wherein the decorative laminate panel image (108) or the positioning code (109) is inkjet printed using one or more free radical UV curable inkjet inks.

* * * * *